United States Patent
Yoshizaki et al.

(10) Patent No.: US 6,634,345 B2
(45) Date of Patent: Oct. 21, 2003

(54) INTERNAL COMBUSTION ENGINE AND METHOD FOR CONTROLLING THE INTERNAL COMBUSTION ENGINE

(75) Inventors: Kouji Yoshizaki, Numazu (JP); Shizuo Sasaki, Numazu (JP); Masato Gotoh, Mishima (JP); Takekazu Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 340 days.

(21) Appl. No.: 09/853,157

(22) Filed: May 11, 2001

(65) Prior Publication Data

US 2001/0054416 A1 Dec. 27, 2001

(30) Foreign Application Priority Data

May 17, 2000 (JP) .......................... 2000-149824

(51) Int. Cl.$^7$ ............................................. F02M 25/107
(52) U.S. Cl. ............................. 123/568.12; 123/568.21; 60/278
(58) Field of Search ....................... 123/568.12, 568.21; 60/274, 278, 605.2

(56) References Cited

U.S. PATENT DOCUMENTS

| 5,890,360 A | 4/1999 | Sasaki et al. |
| 5,937,639 A | 8/1999 | Sasaki et al. |
| 6,490,857 B2 * | 12/2002 | Sasaki .......................... 60/278 |

FOREIGN PATENT DOCUMENTS

| EP | 0 967 373 A2 | 12/1999 |
| EP | 0 987 425 A1 | 3/2000 |
| JP | A 62-007943 | 1/1987 |
| JP | A 2000-8964 | 1/2000 |
| JP | A 2000-97017 | 4/2000 |

OTHER PUBLICATIONS

Sasaki et al., "Smoke–less Rich Combustion by Low Temperature Oxidation in Diesel Engines", Aachener Kolloquium Fahrzeug–und Motorentechnik 2000.

Sasaki et al., "A Study of Low Temperature Diesel Combustion System", Toyota Technical Review, vol. 50, No. 2, Dec. 2000.

Akihama et al., "Mechanism of the Smokeless Rich Diesel Combustion by Reducing Temperature", SAE paper 2001–01–0655.

* cited by examiner

*Primary Examiner*—Henry C. Yuen
*Assistant Examiner*—Arnold Castro
(74) *Attorney, Agent, or Firm*—Oliff & Berridge, PLC

(57) ABSTRACT

An internal combustion engine has an EGR passage provided with an EGR control valve and a catalyst for purifying the EGR gas. When the internal combustion engine operates in a low-temperature combustion mode in which the amount of EGR gas supplied to a combustion chamber is larger than that of EGR gas with which the amount of soot produced reaches a peak, and almost no soot is produced, a controller reduces an opening amount of the exhaust gas recirculation control valve so as to increase an exhaust gas temperature, and reduces an opening amount of the throttle valve so as to suppress an increase in the amount of the EGR gas, thereby to reduce reductions in the temperature of the EGR gas and the temperature of the catalyst.

9 Claims, 17 Drawing Sheets

INTERNAL COMBUSTION ENGINE AND METHOD FOR CONTROLLING THE INTERNAL COMBUSTION ENGINE

INCORPORATION BY REFERENCE

The disclosure of Japanese Patent Application No. 2000-149824 filed on May 17, 2000, including the specification, drawings and abstract, is incorporated herein by reference in its entirety.

BACKGROUND OF THE INVENTION

1. Field of the Invention

The invention relates to an internal combustion engine having an exhaust gas recirculation passage through which exhaust gas discharged from a combustion chamber is recirculated into an intake passage of the engine, and also relates to a method for controlling such an internal combustion engine.

2. Description of Related Art

In one type of conventional internal combustion engines, an exhaust gas recirculation passage having an exhaust gas recirculation control valve is provided for recirculating exhaust gas discharged from a combustion chamber into an intake passage of the engine, and a catalyst for purifying recirculated exhaust gas that flows through the exhaust gas recirculation passage is disposed within the exhaust gas recirculation passage, while a throttle valve is disposed within the engine intake passage. In this type of internal combustion engine, as the amount of recirculated exhaust gas supplied into the combustion chamber increases, the amount of soot produced gradually increases and reaches a peak. As the amount of recirculated exhaust gas supplied into the combustion chamber further increases, the temperature of fuel and its surrounding gas at the time of combustion in the combustion chamber becomes lower than a temperature at which soot is normally produced, and therefore almost no soot is produced. Thus, the internal combustion engine is able to burn an air-fuel mixture almost without producing any soot, by controlling the amount of recirculated exhaust gas supplied into the combustion chamber to be greater than that with which the amount of soot produced reaches a peak. An example of this type of internal combustion engine is disclosed in, for example, Japanese Laid-open Patent Publication No. 2000-8964.

When the engine operates in the above-described combustion mode in which the amount of recirculated exhaust gas supplied into the combustion chamber is greater than that with which the amount of soot produced reaches a peak, and thus almost no soot is produced, and the air-fuel ratio is slightly lean, the opening amount of an exhaust gas recirculation control valve is reduced and the opening amount of the throttle valve is also reduced, as compared with the case where the air-fuel ratio is lean, as disclosed in the above-identified publication JP-A-2000-8964. However, there is no disclosure in this publication as to how the opening amounts of the exhaust gas recirculation control valve and the throttle valve are controlled when the air-fuel ratio is shifted to the rich side of the stoichiometric ratio during an engine operation in which the amount of recirculated exhaust gas supplied into the combustion chamber is greater than that with which the amount of soot produced reaches a peak and almost no soot is produced. If the opening amount of the exhaust gas recirculation control valve is not reduced while the opening amount of the throttle valve is reduced when the air-fuel ratio is shifted to the rich side of the stoichiometric ratio during the engine operation as described above, the amount of recirculation exhaust gas increases. As a result, the combustion temperature decreases, and the temperature of recirculated exhaust gas is accordingly lowered, resulting in a reduction in the temperature of the catalyst for purifying the recirculated exhaust gas. Consequently, the catalyst for purifying the recirculated exhaust gas gets poisoned by SOF (soluble organic fraction), namely, the catalyst suffers from so-called SOF poisoning.

SUMMARY OF THE INVENTION

It is an object of the invention to provide an internal combustion engine capable of substantially preventing a catalyst for purifying recirculated exhaust gas from suffering SOF poisoning, when the air-fuel ratio is shifted to a rich side of the stoichiometric ratio during an engine operation in which the amount of recirculated exhaust gas supplied into a combustion chamber is greater than that with which the amount of soot produced reaches a peak and substantially no soot is produced. It is another object of the invention to provide a method for controlling such an internal combustion engine.

To accomplish the above and/or other objects, one aspect of the invention provides an internal combustion engine, which includes (1) an exhaust gas recirculation control valve disposed in an exhaust gas recirculation passage through which an exhaust gas discharged from a combustion chamber is recirculated into an intake passage of the engine, (2) a catalyst disposed in the exhaust gas recirculation passage, the catalyst being operable to purify recirculated exhaust gas passing through the exhaust gas recirculation passage, and (3) a throttle valve disposed in the intake passage. In the internal combustion engine, an amount of soot produced gradually increases and reaches a peak as an amount of the recirculated exhaust gas supplied to the combustion chamber increases, and, when the amount of the recirculated exhaust gas supplied to the combustion chamber further increases, a temperature of fuel and surrounding gas at the time of combustion in the combustion chamber becomes lower than temperatures that permit production of soot. Thus, the internal combustion engine may operate in a combustion mode in which the amount of the recirculated exhaust gas supplied to the combustion chamber is larger than that of the recirculated exhaust gas with which the amount of soot produced reaches a peak, and almost no soot is produced. A controller of the engine according to the invention reduces an opening amount of the exhaust gas recirculation control valve and reduces an opening amount of the throttle valve when the air-fuel ratio is shifted to a rich side of the stoichiometric ratio while the engine is operating in the combustion mode in which almost no soot is produced, as compared with when the air-fuel ratio is not shifted to the rich side of the stoichiometric ratio.

In the internal combustion engine according to one aspect of the invention as described above, the opening amount of the exhaust gas recirculation control valve is reduced and the opening amount of the throttle valve is also reduced when the air-fuel ratio is shifted to a rich side of the stoichiometric ratio while the engine is operating in the low-temperature combustion mode in which almost no soot is produced, as compared with the case where the air-fuel ratio is not shifted to the rich side of the stoichiometric ratio. By reducing the opening amount of the throttle valve, the pumping loss is increased so that the exhaust gas temperature can be raised. Furthermore, the opening amount of the exhaust gas recirculation control valve is reduced so as to prevent the amount of the recirculated exhaust gas from increasing with a reduction in the opening amount of the throttle valve. This makes it possible to suppress reduction in the combustion temperature and also suppress reduction in the recirculated exhaust gas temperature. Consequently, an otherwise possible reduction in the temperature of the catalyst for purifying the recirculated exhaust gas is prevented, and SOF poisoning of this catalyst can be advantageously suppressed or avoided.

In one preferred form of the invention, an amount of reduction in the opening amount of the exhaust gas recirculation valve is increased with a reduction in a load of the internal combustion engine.

Since the combustion temperature tends to be lowered as the load becomes lighter, the amount of reduction in the opening amount of the exhaust gas recirculation control valve is increased as the load decreases. This arrangement makes it possible to prevent the EGR gas purifying catalyst from suffering from SOF poisoning due to an otherwise possible reduction in the combustion temperature with a reduction in the load.

In another preferred form of the invention, an amount of reduction in the opening amount of the exhaust gas recirculation valve is increased with an increase in a revolution speed of the internal combustion engine.

Since the intake pipe negative pressure increases and the amount of the recirculated exhaust gas tends to increase as the engine speed becomes higher, the amount of reduction in the opening amount of the exhaust gas recirculation control valve is increased as the engine speed increases. This arrangement makes it possible to prevent the EGR gas purifying catalyst from suffering from SOF poisoning due to an otherwise possible increase in the amount of the recirculated exhaust gas resulting from an increase in the engine speed.

In a further preferred form of the invention, an amount of reduction in the opening amount of the exhaust gas recirculation valve is increased as the air-fuel ratio is shifted to a richer side of stoichiometric ratio.

Since the combustion temperature tends to decrease as the air-fuel ratio is shifted further to the rich side from the stoichiometric ratio, the amount of reduction in the opening amount of the exhaust gas recirculation control valve is increased as the air-fuel ratio is shifted further to the richer side. This arrangement makes it possible to prevent the EGR gas purifying catalyst from suffering from SOF poisoning due to an otherwise possible reduction in the combustion temperature resulting from a shift of the air-fuel ratio to the richer side.

BRIEF DESCRIPTION OF THE DRAWINGS

The foregoing and/or further objects, features and advantages of the invention will become apparent from the following description of preferred embodiments with reference to the accompanying drawings, in which like numerals are used to represent like elements and wherein.

DETAILED DESCRIPTION OF PREFERRED EMBODIMENTS

Preferred embodiments of the invention will be described hereinafter with reference to the accompanying drawings.

Figure 1:
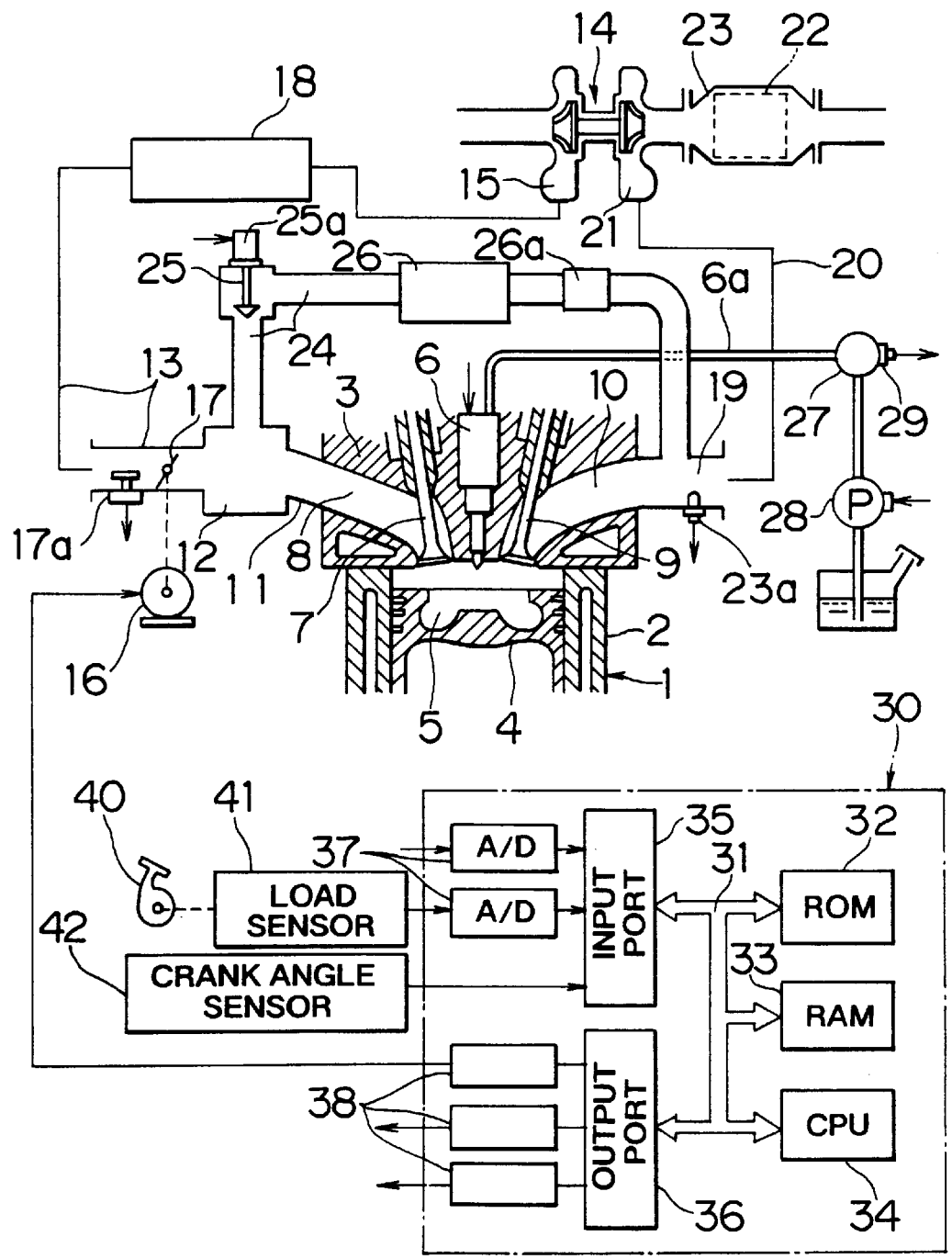
FIG. 1 is a diagram illustrating the overall construction of a compression ignition type internal combustion engine according to a first embodiment of the invention.

FIG. 1 shows a first embodiment of the invention when it is applied to a compression ignition type internal combustion engine. The internal combustion engine as shown in FIG. 1 includes a main body 1 of the engine, a cylinder block 2, a cylinder head 3, a piston 4, a combustion chamber 5, an electrically controlled fuel injection valve 6, an intake valve 7, an intake port 8, an exhaust valve 9, and an exhaust port 10. The intake port 8 communicates with a surge tank 12 via a corresponding intake branch pipe 11. The surge tank 12 is connected to a compressor 15 of an exhaust turbocharger 14 via an intake duct 13. A throttle valve 17 that is driven by a stepping motor 16 is disposed within the intake duct 13. A mass flow meter 17a for detecting the mass flow of intake air is disposed within the intake duct 13 located upstream of the throttle valve 17. Furthermore, an intercooler 18 for cooling intake air flowing in the intake duct 13 is disposed around the intake duct 13. In the embodiment shown in FIG. 1, engine coolant is fed to the intercooler 18 so as to cool the intake air. On the other hand, the exhaust port 10 is connected to an exhaust turbine 21 of the exhaust turbocharger 14 via an exhaust manifold 19 and an exhaust pipe 20. An outlet of the exhaust turbine 21 is connected to a casing 23 that contains a catalyst 22 having an oxidizing function. An air-fuel ratio sensor 23a is disposed within the exhaust manifold 19.

The exhaust manifold 19 and the surge tank 12 are connected to each other through an exhaust gas recirculation (hereinafter, referred to as "EGR") passage 24. An electrically controlled EGR control valve 25 that is driven by a stepping motor 25a is disposed within the EGR passage 24. Also, a pipe catalyst 26a for purifying EGR gas that passes through the EGR passage 24 is disposed in the EGR passage 24. An EGR cooler 26 for cooling EGR gas that flows through the EGR passage 24 is disposed around the EGR passage 24. In the embodiment as shown in FIG. 1, engine coolant is fed to the EGR cooler 26 so that the EGR gas is cooled by the engine coolant.

Each fuel injection valve 6 is connected to a fuel reservoir, namely, a generally-termed common rail 27, via a fuel supply pipe 6a. In operation, fuel is supplied from an electrically controlled fuel pump 28 whose delivery amount is variable, into the common rail 27. The fuel supplied to the common rail 27 is then supplied to each fuel injection valve 6 through a corresponding fuel supply pipe 6a. The common rail 27 is equipped with a fuel pressure sensor 29 for detecting the fuel pressure within the common rail 27. In operation, the fuel delivery amount of the fuel pump 28 is controlled based on an output signal of the fuel pressure sensor 29 so that the fuel pressure within the common rail 27 becomes equal to a target fuel pressure.

An electronic control unit 30 is in the form of a digital computer having a ROM (read only memory) 32, a RAM (random access memory) 33, a CPU (microprocessor) 34, an input port 35 and an output port 36 which are connected to each other via a bidirectional bus 31. The input port 35 receives an output signal of the fuel pressure sensor 29, an output signal of the mass flow meter 17a, and an output signal of the air-fuel ratio sensor 23a, via corresponding AD converters 37. A load sensor 41 that is connected to an accelerator pedal 40 generates an output voltage that is proportional to the amount of depression L of the accelerator pedal 40. The input port 35 receives the output voltage of the load sensor 41 via a corresponding AD converter 37. Also connected to the input port 35 is a crank angle sensor 42 that generates an output pulse each time the crankshaft rotates, for example, 30°. On the other hand, the output port 36 is connected to the fuel injection valves 6, the stepping motor 16 for driving the throttle valve 17, the stepping motor 25a for driving the EGR control valve 25, and the fuel pump 28, via corresponding drive circuits 38.

Figure 2:
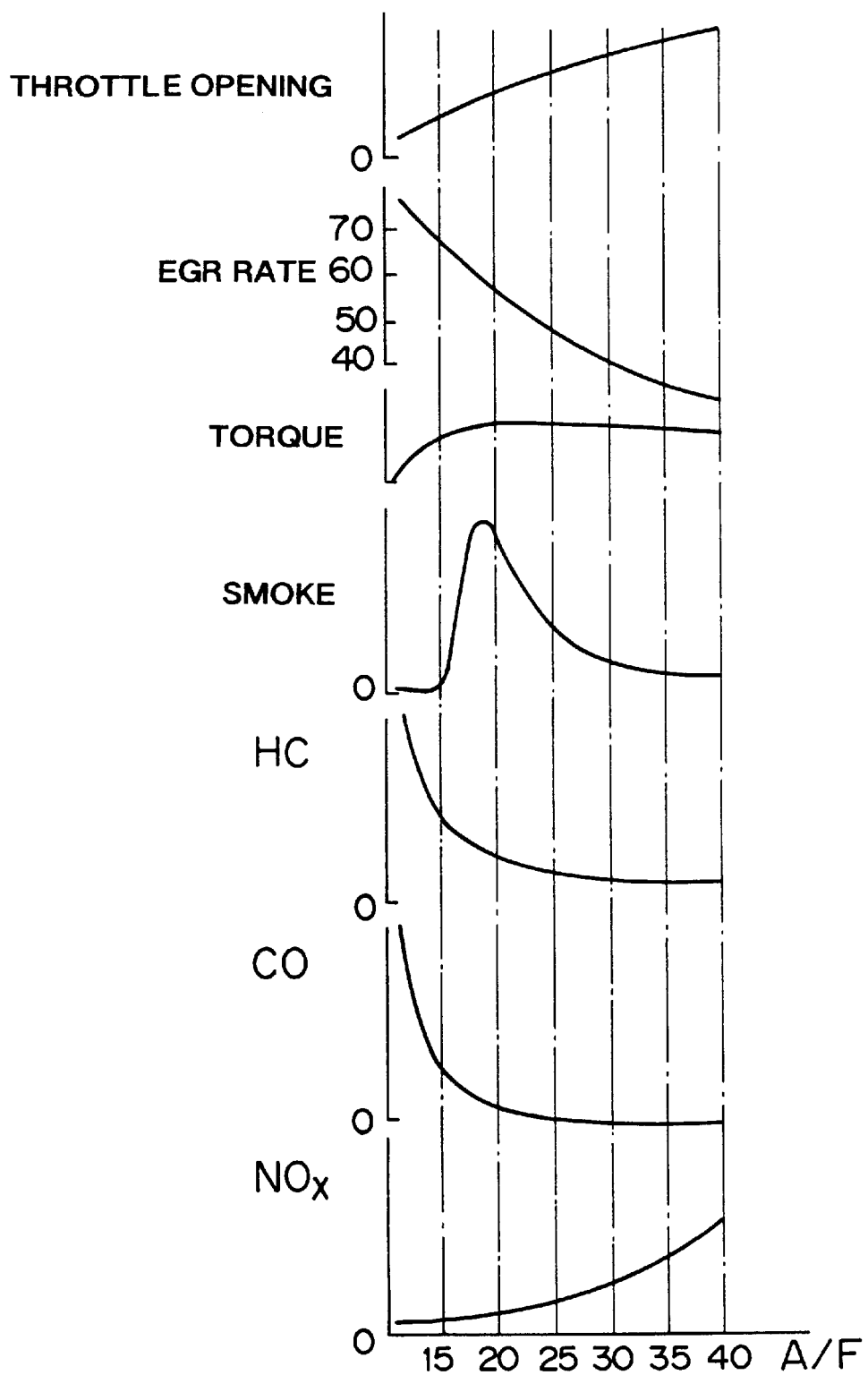
FIG. 2 is a diagram indicating the throttle opening, the EGR rate, the torque, the amounts of smoke, HC, CO and NOx produced, in relation to the air-fuel ratio.

FIG. 2 indicates changes in the output torque and changes in the discharge amounts of smoke, HC, CO and NOx in an experiment in which the air-fuel ratio A/F (the horizontal axis in FIG. 2) is varied by changing the opening amount of the throttle valve 17 and the EGR rate during a low-load operation of the engine. It is understood from FIG. 2 that the air-fuel ratio A/F decreases as the EGR rate is increased in this experiment, and that the air-fuel ratio A/F is equal to or smaller than the stoichiometric air-fuel ratio (14.6) when the EGR rate is equal to or greater than 65%. In the course of reducing the air-fuel ratio A/F by increasing the EGR rate as indicated in FIG. 2, the amount of smoke produced from the engine starts increasing when the EGR rate reaches the vicinity of 40% and the air-fuel ratio A/F becomes equal to about 30. If the EGR rate is further increased to reduce the air-fuel ratio A/F, the amount of smoke produced rapidly increases, and reaches its peak. If the EGR rate continues to be further increased so as to reduce the air-fuel ratio A/F, the amount of smoke sharply decreases, and becomes substantially equal to zero when the EGR rate is controlled to 65% or greater and the air-fuel ratio A/F is thereby reduced to about 15.0. Thus, substantially no soot is produced. At this time, the engine output torque slightly decreases, and the amount of NOx produced becomes considerably small. In contrast, the amounts of HC and CO produced start increasing.

Figure 3A:
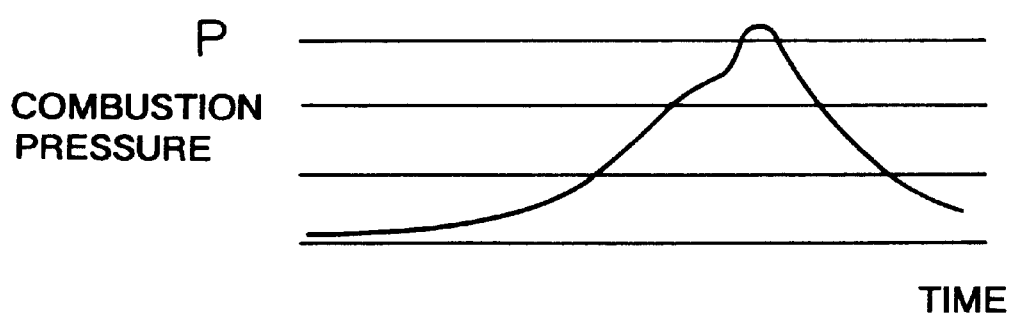
FIGS. 3A and 3B are diagrams indicating changes in the combustion pressure with time.
Figure 3B:
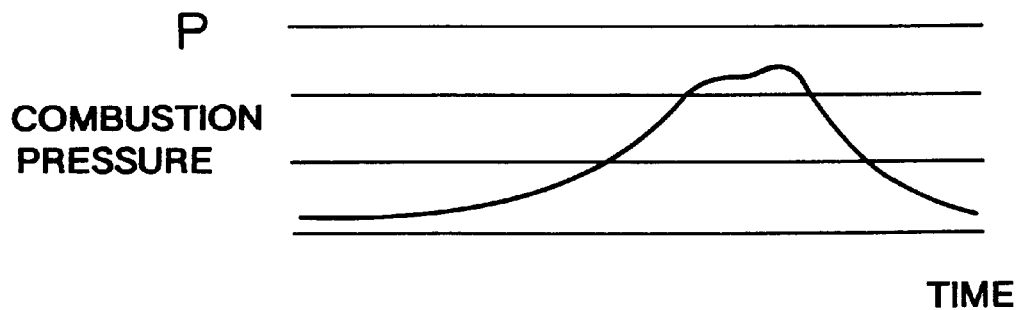

FIG. 3A indicates changes in the combustion pressure within the combustion chamber 5 when the amount of smoke produced reaches its maximum or peak with the air-fuel ratio A/F being equal to about 21. FIG. 3B indicates changes in the combustion pressure within the combustion chamber 5 when the amount of smoke produced is substantially zero with the air-fuel ratio A/F being equal to about 18. By comparing FIG. 3A with FIG. 3B, it will be understood that the combustion pressure is lower in the case of FIG. 3B where the amount of smoke produced is substantially zero, as compared with the case of FIG. 3A where a large amount of smoke is produced. As will be described later, the engine is selectively operable in a first combustion mode (low-temperature combustion mode) in which the amount of the EGR gas supplied to the combustion chamber 5 is greater than the amount of the EGR gas with which the amount of soot produced reaches its peak, resulting in substantially no soot produced, and in a second combustion mode (according to a conventional combustion method) in which the amount of the EGR gas supplied to the combustion chamber 5 is less than the amount of the EGR gas with which the amount of soot produced reaches its peak. Although not indicated in the drawings, it is found from results of experiments similar to those of FIGS. 3A and 3B that the maximum value (peak) of the combustion pressure that occurs when the engine is in the first combustion mode (or low-temperature combustion mode) is lower than the maximum value (peak) of the combustion pressure that occurs when the engine is in the second combustion mode It follows that variations in the engine revolution due to explosions during the first combustion mode is less than those due to explosions during the second combustion mode.

It will be understood from the results of the experiments as indicated in FIGS. 2, 3A and 3B that the amount of NOx produced is considerably reduced when the air-fuel ratio A/F is equal to or less than 15.0 and almost no smoke is produced, as indicated in FIG. 2. The reduction in the amount of NOx produced suggests that the combustion temperature within the combustion chamber 5 is lowered. Thus, the combustion temperature within the combustion chamber 5 is lowered when almost no soot is produced. It will be also understood from FIGS. 3A and 3B that the combustion pressure is reduced in the state of FIG. 3B in which almost no soot is produced, and therefore the combustion temperature in the combustion chamber is lowered.

Figure 4:
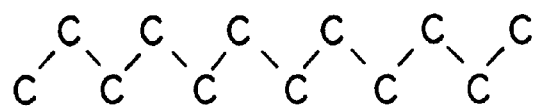
FIG. 4 is a diagram illustrating molecules of fuel.
Figure 4:
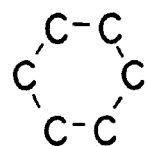
Figure 4:
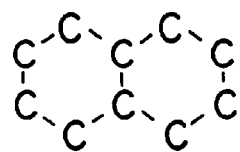

As indicated in FIG. 2, the amounts of HC and CO discharged from the combustion chamber increase as the amount of smoke produced, namely, the amount of soot produced, becomes substantially equal to zero. This means that hydrocarbon is discharged without being converted into soot. Namely, straight chain hydrocarbons or aromatic hydrocarbons contained in the fuel as shown in FIG. 4 thermally decompose to form a precursor of soot as the temperature is raised with a lack of oxygen. Then, soot is produced which mainly consists of a solid as an aggregate of carbon atoms. In this connection, the actual process of formation of soot is complicated, and the form taken by the soot precursor is not clear. In any event, hydrocarbons as shown in FIG. 4 grow into soot after being converted into a precursor of soot. While the amounts of HC and CO discharged from the combustion chamber increase as shown in FIG. 2 when the amount of soot produced becomes substantially zero, as described above, HC discharged at this time is regarded as a precursor of soot or hydrocarbons that precede the precursor.

It follows from the above considerations based on the results of experiments as shown in FIG. 2 and FIGS. 3A and 3B that the amount of soot produced becomes substantially zero when the combustion temperature within the combustion chamber 5 is low, and a soot precursor or hydrocarbons preceding the precursor is/are discharged from the combustion chamber 5. Further experiments and studies have revealed that the process of formation of soot is stopped midway, namely, no soot is produced, when the temperature of the fuel and its surrounding gas within the combustion chamber 5 is equal to or lower than a certain temperature, and that soot is produced when the temperature of the fuel and its surrounding within the combustion chamber 5 is higher than the above-indicated certain temperature.

The temperature of the fuel and its surrounding gas at which the growth process of hydrocarbon stops or ends in the state of a precursor of soot, namely, the aforementioned certain temperature, cannot be determined as a specific temperature since it depends upon the type of the fuel, air-fuel ratio, compression ratio and other factors. Nevertheless, the aforementioned certain temperature has a close relationship with the amount of NOx produced, and can be therefore defined by some degree based on the amount of NOx produced. Namely, as the EGR rate increases, the temperature of the fuel and its surrounding gas decreases, and the amount of NOx produced decreases. Almost no soot is produced when the amount of NOx produced becomes equal to about 10 p.p.m. or less. Accordingly, the aforementioned certain temperature is substantially equal to the temperature at which the amount of NOx produced is about 10 p.p.m. or less.

Once soot is formed, it is almost impossible to remove the soot through an after treatment using a catalyst having an oxidizing function. In contrast, a precursor of soot or hydrocarbons preceding the soot precursor can be easily removed through an after treatment using a catalyst having an oxidizing function. Taking account of the after treatment using a catalyst having an oxidizing function, a considerably large difference is made depending on whether hydrocarbon is discharged from the combustion chamber 5 in the form of a precursor of soot or in the form preceding the precursor, or discharged therefrom in the form of soot. The novel combustion system used in the invention is characterized by discharging hydrocarbon in the form of a precursor of soot or its preceding form from the combustion chamber 5 without producing soot in the combustion chamber 5, and oxidizing the discharged hydrocarbon by means of a catalyst having an oxidizing function.

To stop the growth of hydrocarbon in the state prior to formation of soot, the temperature of the fuel and its surrounding gas during combustion in the combustion chamber 5 needs to be controlled to a temperature that is lower than the temperature at which soot is normally formed. In this case, it is found that the temperature of the fuel and its surrounding gas, which is to be reduced, is greatly influenced by the heat absorbing function of gas surrounding the fuel upon its combustion. More specifically, if only air is present around fuel, the vaporized fuel immediately reacts with oxygen in the air and burns. In this case, the temperature of the air remote from the fuel is not much elevated, and only the temperature around the fuel is locally elevated to a considerably high level. Namely, the air present remote from the fuel hardly functions to absorb combustion heat of the fuel. In this case, the combustion temperature locally rises to an extremely high level, and therefore unburned hydrocarbon is exposed to the combustion heat, and thus forms soot.

However, the situation will be somewhat different in the case where the fuel exists in a mixture of a large amount of inert gas and a small amount of air. More specifically, evaporative fuel diffuses around, and reacts with oxygen that is mixed with the inert gas, and burns. In this case, combustion heat is absorbed by the surrounding inert gas, and therefore the combustion temperature does not rise so much, namely, the combustion temperature can be limited to a relatively low level. Thus, the inert gas present in the combustion chamber plays an important role in lowering the combustion temperature, and the combustion temperature can be controlled to a relatively low level, utilizing the heat absorbing function of the inert gas. In this case, it is necessary to provide inert gas in an amount large enough to absorb a sufficient quantity of heat so as to control the temperature of the fuel and its surrounding gas to a temperature lower than the level at which soot is normally formed. Thus, a required amount of inert gas increases with an increase in the amount of the fuel used for combustion. In this connection, the inert gas performs a more powerful or effective heat absorbing function as the specific heat of the inert gas is larger. It is therefore preferable to use a gas having a larger specific heat as inert gas. Since $CO_2$ and the EGR gas have relatively large specific heats, it is preferable to use the EGR gas as the inert gas.

Figure 5:
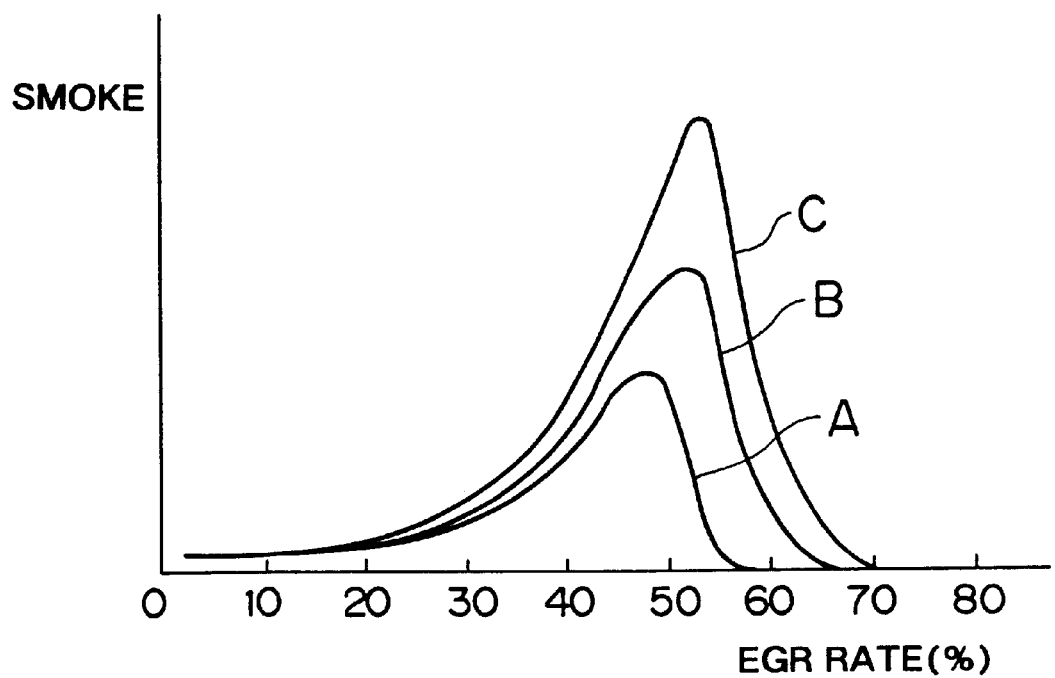
FIG. 5 is a diagram indicating the relationship between the amount of smoke produced and the EGR rate.

FIG. 5 indicates the relationship between the EGR rate and smoke when the EGR gas is used as an inert gas and the EGR gas is cooled to various degrees. In FIG. 5, curve A represents a case where the EGR gas is powerfully cooled, and the temperature of the EGR gas is maintained at about 90° C., and curve B represents a case where the EGR gas is cooled by a small-sized cooling system. Furthermore, curve C represents a case where the EGR gas is not forcibly cooled.

When the EGR gas is powerfully cooled as indicated by curve A in FIG. 5, the amount of soot produced reaches a peak at a point where the EGR rate is a little less than 50%. In this case, almost no soot is produced if the EGR rate is controlled to about 55% or greater. When the EGR gas is cooled by some degree as indicated by curve B in FIG. 5, on the other hand, the amount of soot produced reaches a peak at a point where the EGR rate is a little greater than 50%. In this case, almost no soot is produced if the EGR rate is controlled to about 65% or greater. When the EGR gas is not forcibly cooled as indicated by curve C in FIG. 5, the amount of soot produced reaches a peak at a point where the EGR rate is in the vicinity of 55%. In this case, almost no soot is produced if the EGR rate is controlled to about 70% or greater. FIG. 5 shows the amount of smoke produced by the engine when the engine load is relatively high. As the engine load is reduced, the EGR rate at which the amount of soot produced reaches a peak is slightly reduced, and the lower limit of the EGR rate at which almost no soot is produced is also slightly lowered. Thus, the lower limit of the EGR rate at which almost no soot is produced varies depending upon the degree of cooling of the EGR gas and the engine load.

Figure 6:
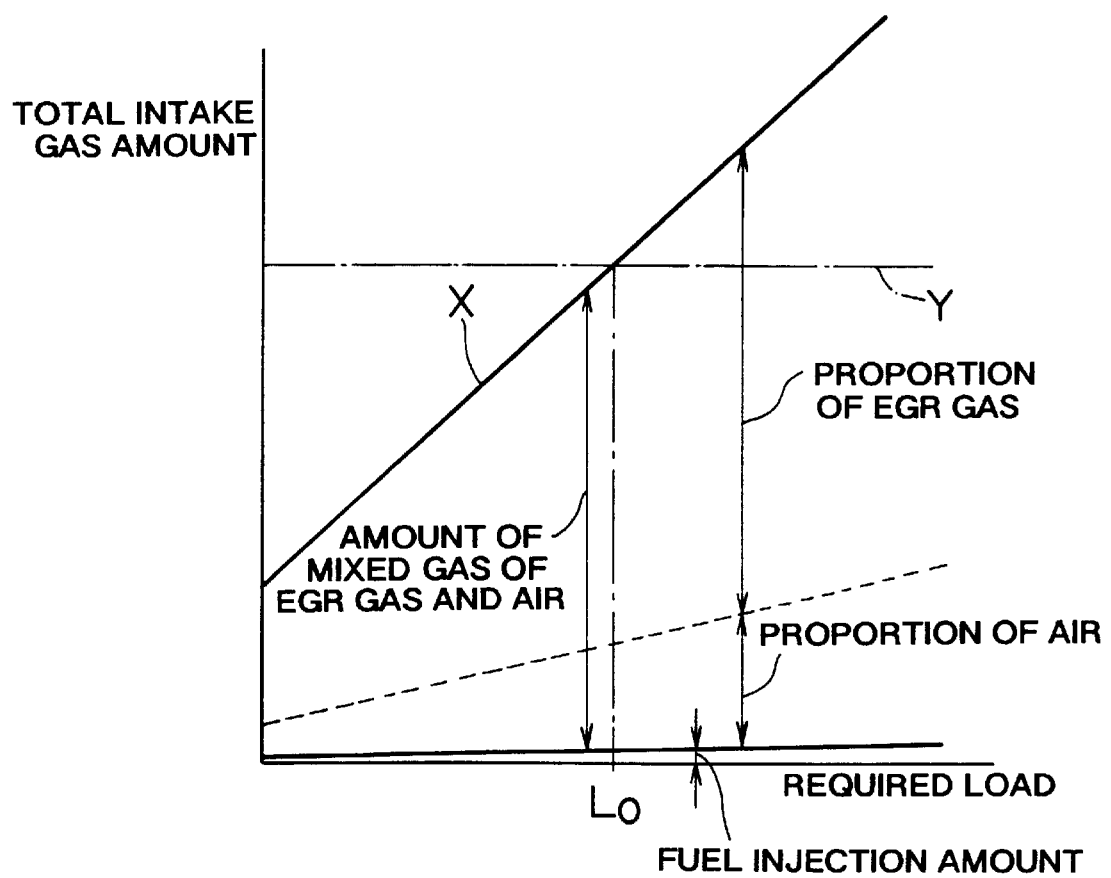
FIG. 6 is a diagram indicating a relationship between the required load and the amount of intake gas that is a mixture of EGR gas and air.

FIG. 6 indicates the amount of a mixed gas of the air and the EGR gas used as an inert gas, which is needed to reduce the temperature of the fuel and its surrounding gas upon combustion to a temperature below the level at which soot is produced, the proportion of the air in the mixed gas, and the proportion of the EGR gas in the mixed gas. In FIG. 6, the vertical axis represents the total amount of gas that is introduced into the combustion chamber 5, and one-dot chain line Y indicates the total amount of gas that can be drawn into the combustion chamber when the engine is not supercharged. The horizontal axis represents the required load.

Referring to FIG. 6, the proportion of the air, namely, the amount of the air present in the mixed gas, represents the amount of the air that is needed to completely burn the fuel injected into the combustion chamber. That is, in the case illustrated in FIG. 6, the ratio of the amount of the air to the amount of the fuel injected is equal to the stoichiometric air-fuel ratio. The proportion of the EGR gas in FIG. 6, namely, the amount of the EGR gas in the mixed gas, represents the minimum amount of EGR gas that is needed to male the temperature of the fuel and its surrounding gas lower than the temperature level at which soot is formed. This amount of EGR gas, as represented in EGR rate, is approximately 55% or greater. In the case of FIG. 6, it is 70% or greater. Namely, if the total amount of intake gas drawn into the combustion chamber 5 is controlled as indicated by solid line X in FIG. 6, and the ratio of the amount of the air to that of the EGR gas in the whole intake gas X is controlled to that as indicated in FIG. 6, the temperature of the fuel and its surrounding gas becomes lower than the level at which soot is produced, and therefore almost no soot is produced. The amount of NOx produced in this case is around 10 p.p.m. or lower, which is considerably small.

If an increased amount of fuel is injected into the combustion chamber, the quantity of heat produced upon burning of the fuel increases, and therefore the quantity of heat absorbed by the EGR gas must be increased in order to keep the temperature of the fuel and its surrounding gas at a level lower than the temperature at which soot is produced. Accordingly, the amount of the EGR gas must be increased as the amount of fuel injected increases, as indicated in FIG. 6. Namely, the amount of the EGR gas needs to be increased as the required load is increased.

When supercharging is not performed, the upper limit of the total amount of intake gas X drawn into the combustion chamber 5 is as indicated by Y. Therefore, in a region in FIG. 6 where the required load is greater than Lo, the air-fuel ratio cannot be maintained at the stoichiometric ratio unless the EGR gas proportion is reduced as the required load increases. That is, the EGR rate is lowered as the required load increases, in an attempt to keep the air-fuel ratio at the stoichiometric air-fuel ratio in the region where the required load is greater than Lo when the supercharging is not performed. Thus, in the region where the required load is greater than Lo, it becomes impossible to keep the temperature of the fuel and its surrounding gas at a level that is lower than the temperature at which soot is produced.

However, if the EGR gas is recirculated to the inlet side of the supercharger, namely, into an air suction pipe of the exhaust turbocharger, via the EGR passage, the EGR rate can be maintained at 55% or higher, for example, 70%, in the region where the required load is greater than Lo, so that the temperature of the fuel and its surrounding gas can be kept at a level below the temperature at which soot is normally produced. Namely, if the EGR gas is recirculated so that the EGR rate in the air suction pipe reaches, for example, 70%, the EGR rate of the intake gas pressurized by the compressor of the exhaust turbocharger also becomes equal to 70%, so that up to the limit of the pressure rise achievable by the compressor, the temperature of the fuel and its surrounding gas can be kept at a level below the temperature that permits production of soot. It is thus possible to expand the operating region of the engine in which the low-temperature combustion can be performed. To control the EGR rate to 55% or greater in the region in which the required load is greater than Lo, the EGR control valve is fully opened, and the throttle valve is driven to some extent in the closing direction.

FIG. 6 indicates the case where the fuel is burned at the stoichiometric air-fuel ratio, as mentioned above. The amount of NOx produced can be controlled to around 10 p.p.m. or less while production of soot is prevented, even if the amount of the air is smaller than that as indicated in FIG. 6, and the air-fuel ratio is rich. Also, even if the amount of the air is made larger than that as indicated in FIG. 6, that is, if the average value of the air-fuel ratio is in a lean range of 17 to 18, the amount of NOx produced can be controlled to around 10 p.p.m. or less while production of soot is prevented.

Although an excessive amount of fuel exists in the combustion chamber when the air-fuel ratio is rich, the excessive fuel does not turn into soot since the combustion temperature is kept at a relatively low level, and therefore no soot is produced. Also, only a considerably small amount of NOx is produced at this time. Even when the average air-fuel ratio is lean or the air-fuel ratio is substantially equal to the stoichiometric air-fuel ratio, a small amount of soot can be produced provided that the combustion temperature is elevated. According to the invention, however, the combustion temperature is controlled to a low level, so that substantially no soot is produced. Furthermore, NOx is produced only in a small amount. Thus, during the low-temperature combustion, no soot is produced and only a very small amount of NOx is produced irrespectively of the air-fuel ratio in the low-load engine operation region, namely, irrespectively of whether the air-fuel ratio is rich or equal to the stoichiometric air-fuel ratio, or the average air-fuel ratio is lean. Accordingly, it is preferable to control the average air-fuel ratio to a fuel-lean ratio in this case, to assure an improved fuel consumption rate.

The temperature of the fuel and its surrounding gas upon combustion thereof in the combustion chamber is controlled to be equal to or lower than the level at which the growth of hydrocarbon is stopped midway, only when the engine is in a low-to-medium load operating state and a small quantity of heat is generated by the combustion. In the embodiment of the invention, therefore, when the engine operates with a low-to-medium load, the first mode of combustion, or low-temperature combustion, is carried out such that the temperature of the fuel and its surrounding gas upon combustion is controlled to or below the temperature level at which the growth of hydrocarbon is stopped midway. When the engine load is relatively high, on the other hand, the second mode of combustion, or conventional combustion that has been ordinarily performed, is carried out. Furthermore, depending on the operating state of the engine, the second mode of combustion may be carried out even when the engine is operated with a low-to-medium load. The term "first mode of combustion", or "low-temperature combustion", refers to a mode of combustion in which the amount of inert gas in the combustion chamber is greater than that at which the amount of soot generated reaches a peak. The term "second mode of combustion", or "conventional combustion", refers to a mode of combustion in which the amount of inert gas in the combustion chamber is less than that at which the amount of soot generated reaches a peak.

Figure 7:
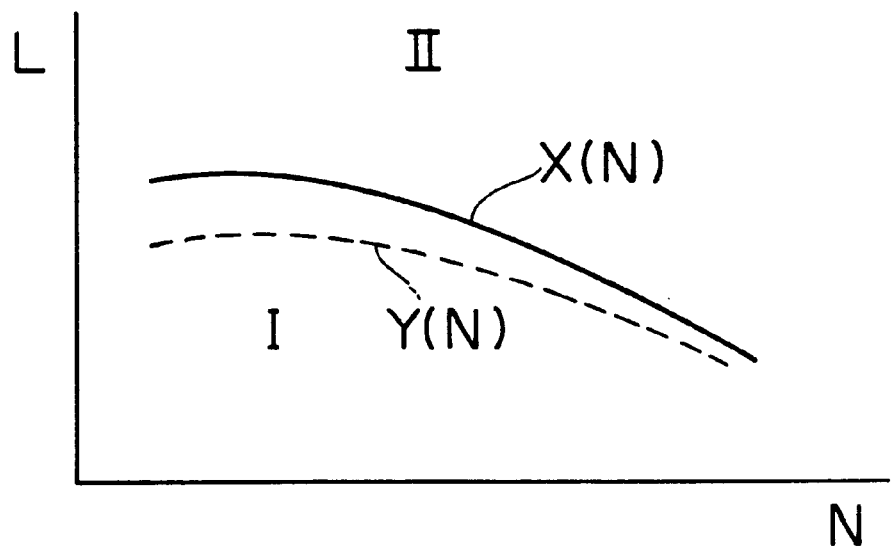
FIG. 7 is a diagram indicating a first operating region I and a second operating region II.

FIG. 7 indicates a first operating region I in which the first mode of combustion, or the low-temperature combustion, is conducted, and the second operating region II in which the second mode of combustion, or conventional combustion, is conducted. In FIG. 7, the vertical axis L represents the amount of depression of the accelerator pedal 40, namely, the required load, and the horizontal axis N represents the engine speed. Also in FIG. 7, X(N) represents a first boundary between the first operating region I and the second operating region II, and Y(N) represents a second boundary between the first operating region I and the second operating region II. A shift from the first operating region I to the second operating region II is judged based on the first boundary X(N), and a shift from the second operating region II to the first operating region I is judged based on the second boundary Y(N).

More specifically, if the required load L exceeds the first boundary X(N) as a function of the engine speed N when the engine is operating in the first operating region I while performing the low-temperature combustion, it is determined that a shift from the first operating region I to the second operating region II has occurred, and combustion is performed in the conventional combustion method. If the required load L is subsequently reduced to be lower than the second boundary Y(N) as a function of the engine speed N, it is then determined that the engine operation has shifted from the second operating region II to the first operating region I, and the low-temperature combustion is conducted again.

The two boundaries, that is, the first boundary X(N) and the second boundary Y(N) on the low-load side of the first boundary X(N), are provided for the following two reasons. The first reason is that the combustion temperature is relatively high in the second operating region II on the high-load side, and therefore the low-temperature combustion cannot be performed immediately upon a reduction in the required load L below the first boundary X(N). That is, the low-temperature combustion can be immediately started, only after the required load L becomes considerably low, that is, lower than the second boundary Y(N). The second reason is that it is desirable to provide a hysteresis with respect to changes between the first operating region I and the second operating region II.

While the engine is operating in the first operating region I in which the low-temperature combustion is conducted, substantially no soot is produced and, instead, unburned hydrocarbon is discharged from the combustion chamber 5 in the form of a soot precursor or in the form preceding the precursor. The unburned hydrocarbon discharged from the combustion chamber 5 is well oxidized by the catalyst 22 having an oxidizing function. The catalyst 22 may be formed by, for example, an oxidation catalyst.

Figure 8:
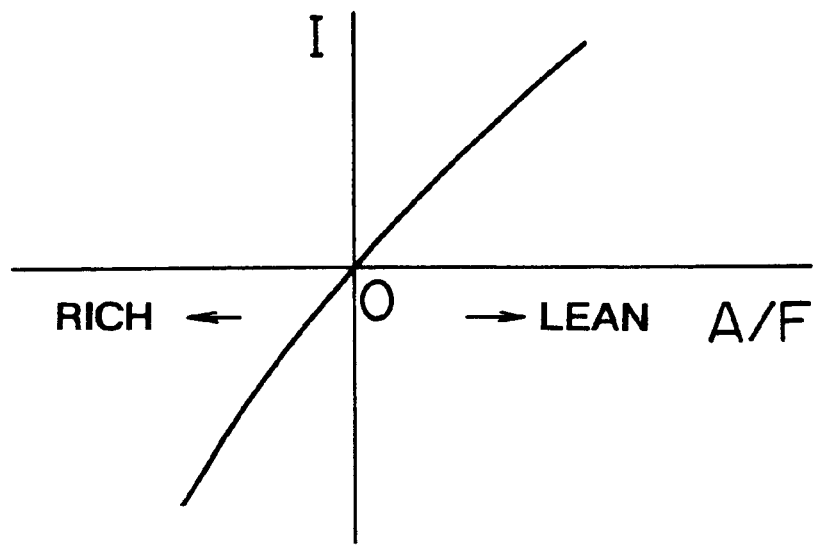
FIG. 8 is a diagram indicating the output of an air-fuel ratio sensor.

FIG. 8 indicates the output of the air-fuel ratio sensor 23a. As indicted in FIG. 8, the output current I of the air-fuel ratio sensor 23a changes in accordance with the air-fuel ratio A/F. Therefore, the air-fuel ratio can be determined from the output current I of the air-fuel ratio sensor 23a.

Figure 9:
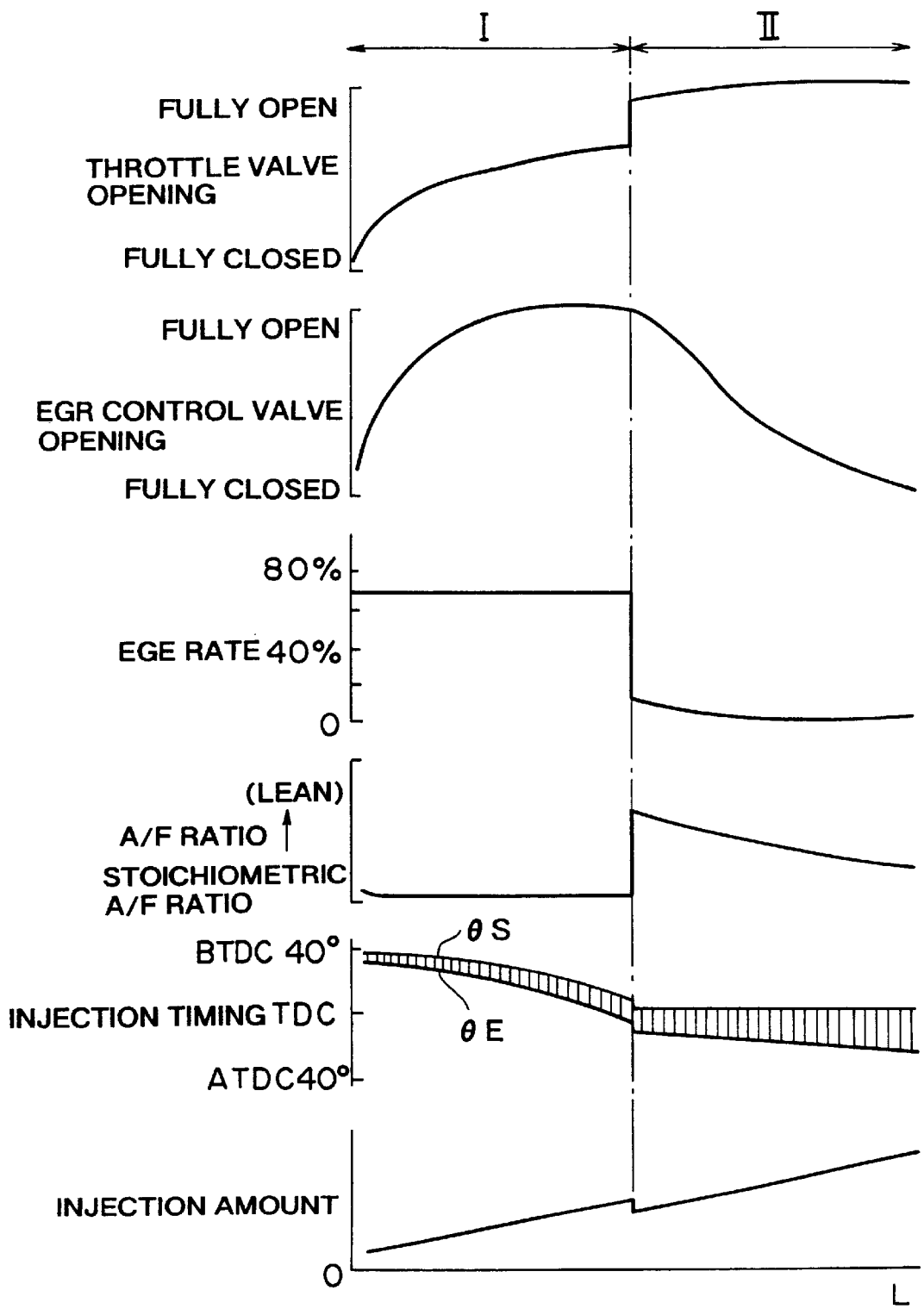
FIG. 9 is a diagram indicating the opening amount of a throttle valve and other parameters in relation to the required load.

Referring next to FIG. 9, engine operation control in the first operating region I and the second operating region II will be briefly described.

FIG. 9 indicates changes in the degree of opening of the throttle valve 17, the degree of opening of the EGR control valve 25, the EGR rate, the air-fuel ratio, the injection timing, and the amount of fuel injected, with respect to the required load L. In the first operating region I in which the required load L is relatively low, the degree of opening of the throttle valve 17 is gradually increased from the vicinity of the fully closed position to about two-thirds of the maximum degree of opening as the required load L increases, as indicated in FIG. 9. Similarly, the degree of opening of the EGR control valve 25 is increased from the vicinity of the fully closed position to the fully open position as the required load L increases. In the first operating region I in the example of FIG. 9, the EGR rate is controlled to about 70%, and the air-fuel ratio is set to a slightly lean air-fuel ratio. That is, in the first operating region I, the opening amount of the throttle valve 17 and the opening amount of the EGR control valve 25 are controlled so that the EGR rate approximates to 70% and the air-fuel ratio becomes a slightly lean air-fuel ratio. Furthermore, in the first operating region I, fuel injection is performed before the piston 4 reaches the compression top dead center TDC. In this case, the injection start timing OS is delayed as the required load L increases, and the injection end timing OE is also delayed as the injection start timing OS is delayed.

While the engine is idling, the throttle valve 17 is placed in the vicinity of the fully closed position, and the EGR control valve 25 is also placed in the vicinity of the fully closed position. With the throttle valve 17 almost fully closed, the pressure in the combustion chamber 5 at the beginning of compression is lowered, and therefore the compression pressure decreases. As the compression pressure decreases, compression work performed by the piston 4 is reduced, whereby vibration of the engine main body 1 is reduced. Namely, the throttle valve 17 is placed in the vicinity of the fully closed position during idling of the engine so as to reduce the compression pressure and thereby suppress vibration of the engine main body 1. Furthermore, since variations in the engine revolution due to explosions are greater during a low-speed engine operation than during a high-speed engine operation, the problem of the vibration of the engine main body 1 becomes more serious when the engine speed is reduced. In this circumstance, the target engine speed for idling, or the target idling speed, is set in view of the vibration caused by the compression pressure and the vibration caused by the varying engine revolution.

When the operating region of the engine changes from the first operating region I to the second operating region II, the opening amount of the throttle valve 17 is increased steppedly from the nearly two-third open position to the fully open position. In the example as shown in FIG. 9, the EGR rate is reduced steppedly from about 70% to 40%, and the air-fuel ratio is increased in a stepped manner. Thus, the EGR rate skips a range in which a large amount of smoke is produced (as shown in FIG. 5), so that a large amount of smoke is prevented from being produced at the time of change of the engine operating region from the first operating region I to the second operating region II.

In the second operating region II, the engine performs conventional combustion that has been conventionally employed. In the second operating region II, the throttle valve 17 is kept in the fully open state except for a part of the region II, and the opening amount of the EGR control valve 23 is gradually reduced as the required load L increases. In this operating region II, the EGR rate decreases with increases in the required load L, and the air-fuel ratio decreases with increases in the required load L. It is, however, to be noted that the air-fuel ratio is kept within a lean range even if the required load L is increased. In the second operating region II, the injection start timing θS is set near the compression top dead center TDC.

Figure 10A:
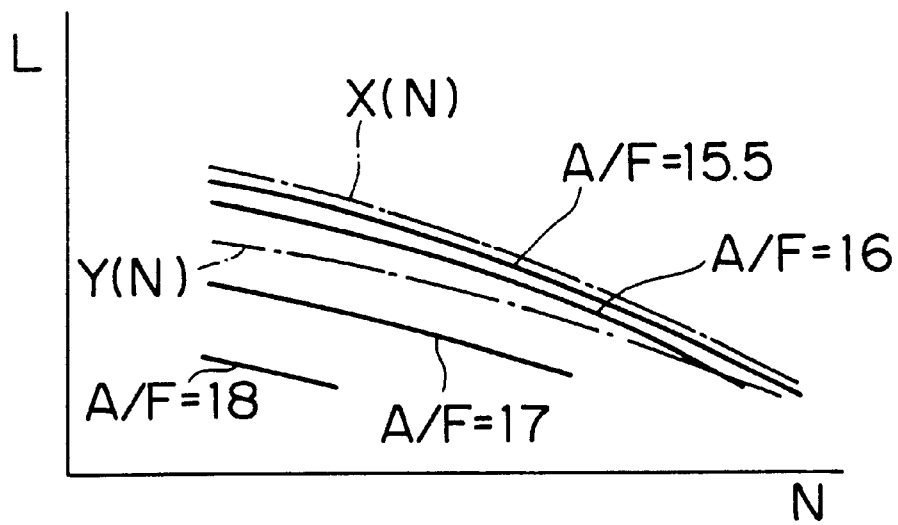
FIG. 10A is a diagram indicating the air-fuel ratios in the first operating region I.

FIG. 10A indicates the target air-fuel ratio A/F to be established in the first operating region I. In FIG. 10A, curves labeled as A/F=15.5, A/F=16, A/F=17, and A/F=18 indicate the cases where that the target air-fuel ratio is set to 15.5, 16, 17, and 18, respectively, and the air-fuel ratio between the curves is determined proportionally. As indicated in FIG. 10A, the air-fuel ratio is lean during the first operating region I. Furthermore, in the first operating region I, the target air-fuel ratio A/F is increased to be even leaner as the required load L is reduced. More specifically, the quantity of heat produced upon combustion is reduced as the required load L is reduced. With a reduction in the required load L, therefore, low-temperature combustion can be performed even with a reduced EGR rate. The air-fuel ratio increases with a reduction in the EGR rate, and therefore the target air-fuel ratio A/F is increased with a reduction in the required load L as indicated in FIG. 10A. The fuel consumption rate improves as the target air-fuel ratio is increased. In this embodiment of the invention, therefore, the target air-fuel ratio A/F is increased with decreases in the required load L so that the resulting air-fuel ratio becomes as lean as possible.

Figure 10B:
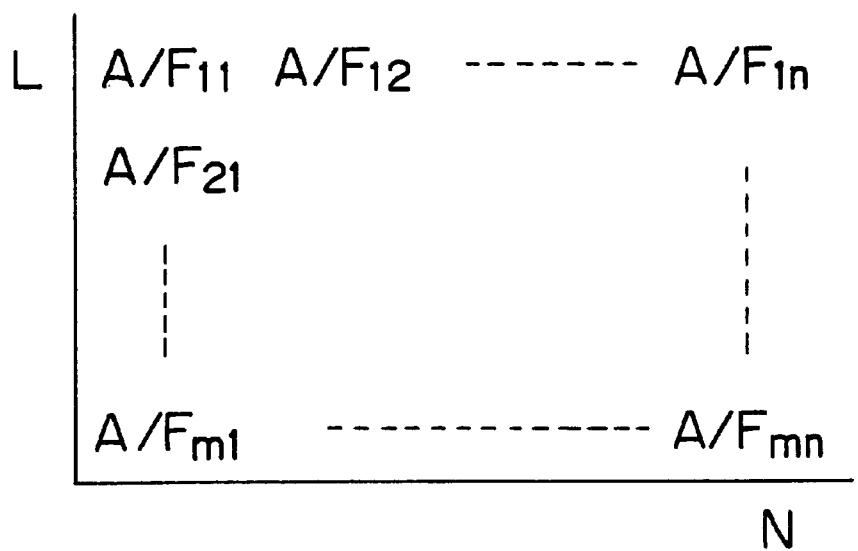
FIG. 10B is a map indicating the air-fuel ratio as a function of the required load and the engine speed.
Figure 11A:
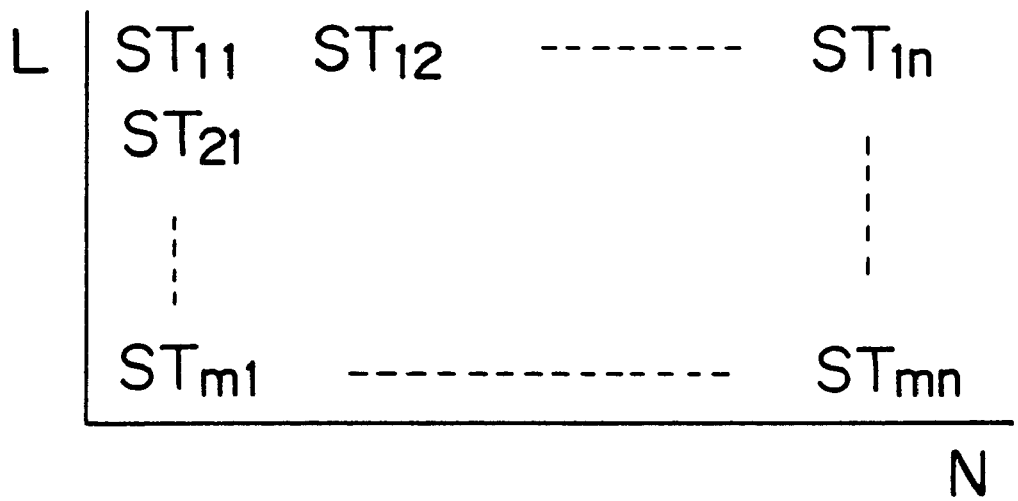
FIG. 11A is a map indicating the target opening amount of the throttle valve as a function of the required load and the engine speed.
Figure 11B:
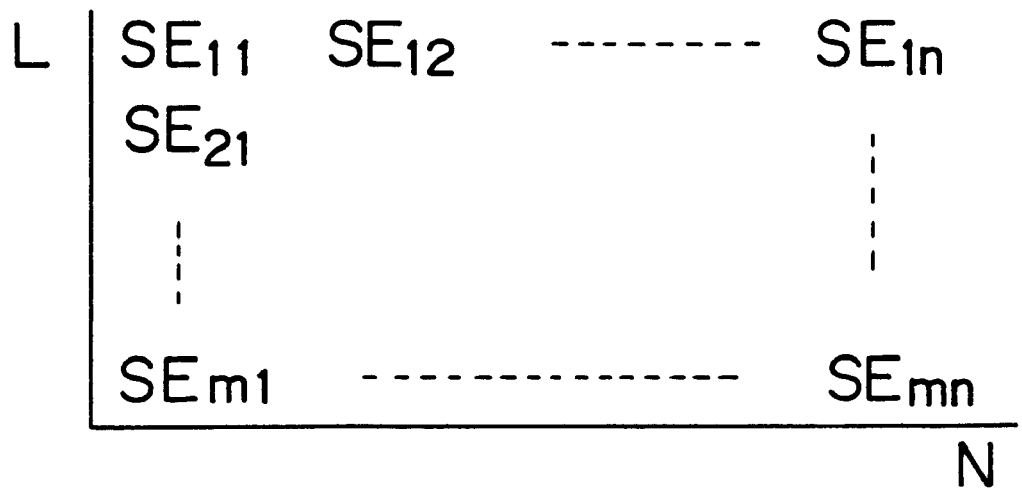
FIG. 11B is a map indicating the target opening amount of an EGR control valve as a function of the required load and the engine speed.

The target air-fuel ratios A/F as indicated in FIG. 10A are pre-stored in the ROM 32 in the form of a map as a function of the required load L and the engine speed N, as indicated in FIG. 10B. Also, the target opening amount ST of the throttle valve 17 needed to make the air-fuel ratio equal to the target air-fuel ratio A/F as indicated in FIG. 10A is pre-stored in the ROM 32 in the form of a map as a function of the required load L and the engine speed N, as shown in FIG. 11A. The target opening amount SE of the EGR control valve 25 needed to make the air-fuel ratio equal to the target air-fuel ratio A/F as indicated in FIG. 10A is pre-stored in the ROM 32 in the form of a map as a function of the required load L and the engine revolution speed N, as shown in FIG. 11B.

Figure 12A:
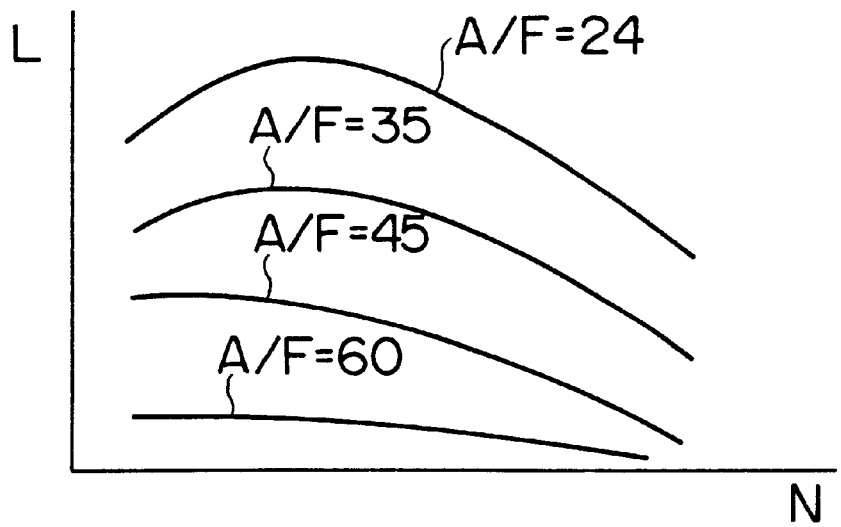
FIG. 12A is a diagram indicating the air-fuel ratios in the second operating region II.
Figure 12B:
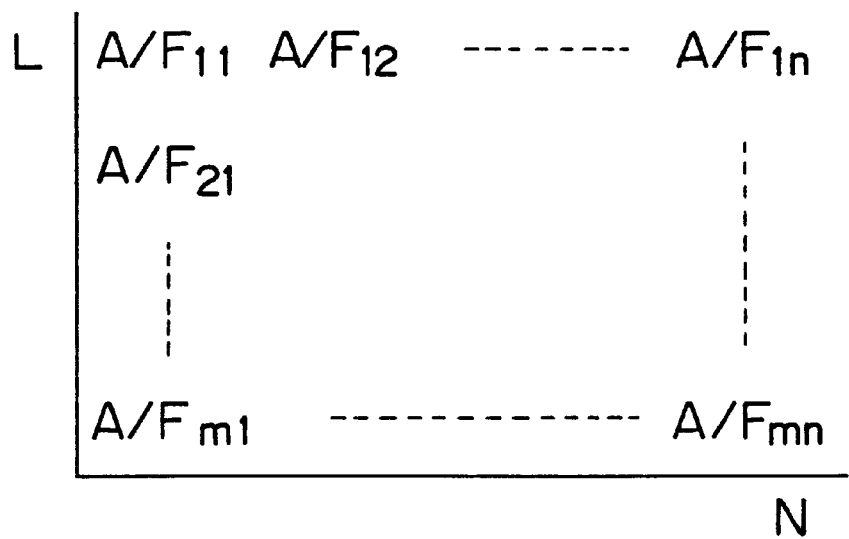
FIG. 12B is a map indicating the air-fuel ratio as a function of the required load and the engine speed.
Figure 13A:
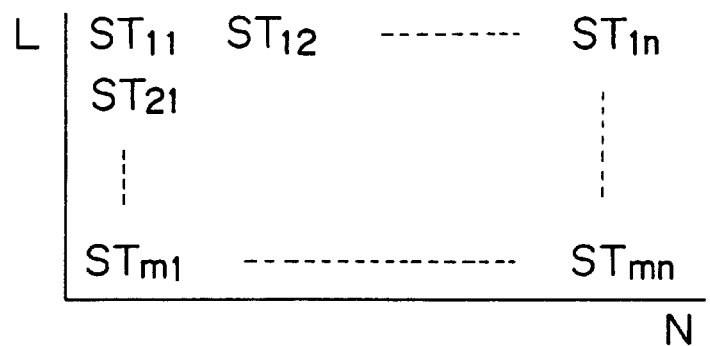
FIG. 13A is a map indicating the target opening amount of the throttle valve as a function of the required load and the engine speed.
Figure 13B:
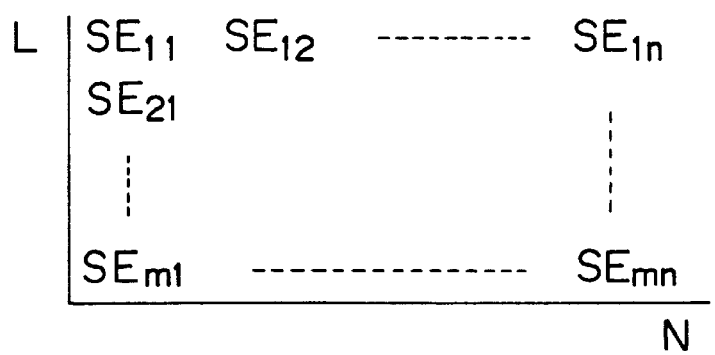
FIG. 13B is a map indicating the target opening amount of an EGR control valve as a function of the required load and the engine speed.

FIG. 12A indicates the target air-fuel ratio A/F set when the second mode of combustion, or ordinary or conventional combustion, is performed. In FIG. 12A, curves labeled as A/F=24, A/F=35, A/F=45, and A/F=60 indicate that the target air-fuel ratio is equal to 24, 35, 45, and 60, respectively. The target air-fuel ratios A/F as indicated in FIG. 12A are pre-stored in the ROM 32 in the form of a map as a function of the required load L and the engine speed N as indicated in FIG. 12B. Also, the target opening amount ST of the throttle valve 17 needed to make the air-fuel ratio equal to the target air-fuel ratio A/F as indicated in FIG. 12A is pre-stored in the ROM 32 in the form of a map as a function of the required load L and the engine speed N, as indicated in FIG. 13A. The target opening amount SE of the EGR control valve 25 needed to make the air-fuel ratio equal to the target air-fuel ratios A/F as indicated in FIG. 12A is pre-stored in the ROM 32 in the form of a map as a function of the required load L and the engine speed N, as indicated in FIG. 13B.

Figure 14:
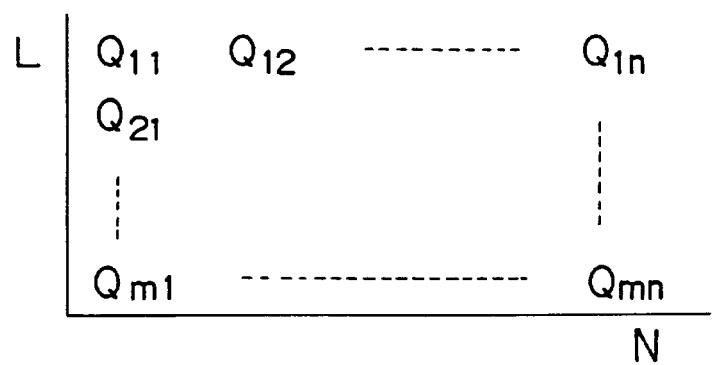
FIG. 14 is a map indicating the amount of fuel injection as a function of the required load and the engine speed.

During the second mode of combustion, the amount of fuel injection Q is calculated based on the required load L and the engine speed N. The amounts of fuel injection Q are pre-stored in the ROM 32 in the form of a map as a function of the required load L and the engine speed N as indicated in FIG. 14.

Figure 15:
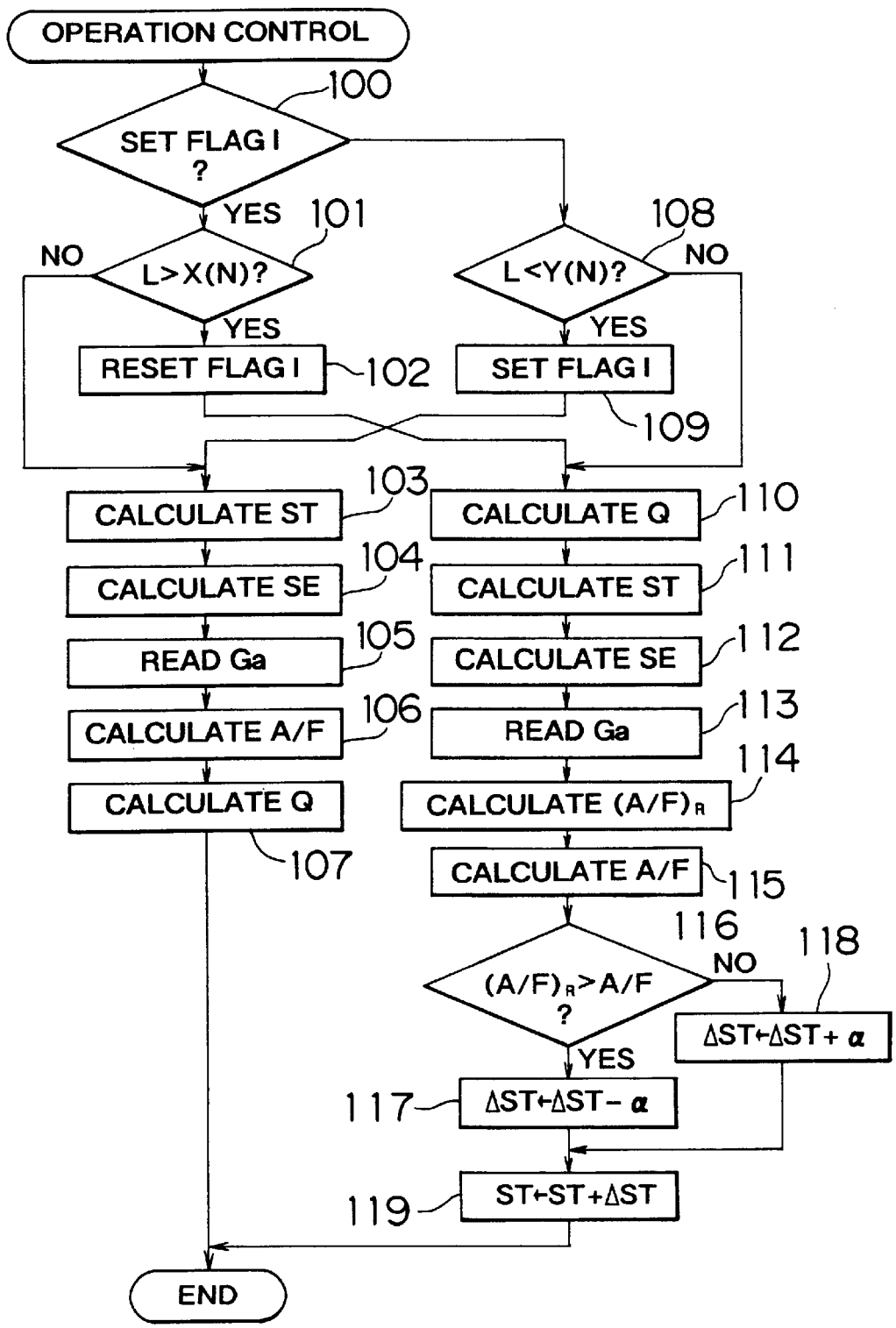
FIG. 15 is a flowchart illustrating a routine for controlling the operation of the engine.

A control routine for controlling an operation of the internal combustion engine as described above will be described with reference to FIG. 15. As shown in FIG. 15, step 100 is initially executed to determine whether a flag I indicating that the current operating state of the engine is in the first operating region I has been set. If the flag I has been set, namely, if the current engine operating state is in the first operating region I, the process proceeds to step 101 in which it is determined whether the required load L has exceeded the first boundary X(N). If L≦X(N), the process proceeds to step 103 in which the first mode of combustion (low-temperature combustion) is conducted. If it is determined in step 101 that L>X(N), on the other hand, the process proceeds to step 102 in which the flag I is reset. Subsequently in step 110, the second mode of combustion (ordinary combustion according to the conventional combustion method) is conducted.

If it is determined in step 100 that the flag I has not been set, that is, if the current engine operating state is in the second operating region II, the process proceeds to step 108 to determine whether the required load L has become lower than the second boundary Y(N). If L≧Y(N), the process proceeds to step 110 in which the second mode of combustion is performed. If it is determined in step 108 that L<Y(N), on the other hand, the process proceeds to step 109 in which the flag I is set. Subsequently, the process proceeds to step 103 in which the first mode of combustion is performed.

In step 103, a target opening amount ST of the throttle valve 17 is calculated from the map as indicated in FIG. 11A, and the opening amount of the throttle valve 17 is controlled to the calculated target opening amount ST. Subsequently in step 104, a target opening amount SE of the EGR control valve 25 is calculated from the map as indicated in FIG. 11B, and the opening amount of the EGR control valve 25 is controlled to the calculated target opening amount SE. Subsequently in step 105, the mass flow of intake air (hereinafter, simply referred to as "intake air flow rate") Ga detected by the mass flow meter 17a is read. Step 105 is followed by step 106 in which a target air-fuel ratio A/F is calculated from the map as indicated in FIG. 10B. Subsequently in step 107, the amount of fuel injection Q needed to make the air-fuel ratio equal to the target air-fuel ratio A/F is calculated from the intake air flow rate Ga and the target air-fuel ratio A/F.

If the required load L or the engine speed N changes while the low-temperature combustion is being performed as described above, the opening amount of the throttle valve 17 and the opening amount of the EGR control valve 25 are immediately made equal to the respective target opening amounts ST, SE set in accordance with the required load L and the engine revolution speed N. For example, if the required load L increases, the amount of air drawn into the combustion chamber 5 is immediately increased, so that the torque generated by the engine immediately is increased. If the opening amount of the throttle valve 17 or the opening amount of the EGR control valve 25 change so that the intake air flow rate Ga changes, the change in the intake air flow rate Ga is detected by the mass flow meter 17a. Based on the detected intake air flow rate Ga, the amount of fuel injection Q is controlled. Thus, the amount of fuel injection Q is changed after the intake air flow rate Ga has actually changed.

In step 110, on the other hand, a target mount of fuel injection Q is calculated from the map as indicated in FIG. 14, and the amount of fuel injected is controlled to the calculated target amount of fuel injection Q. Subsequently in step 111, a target degree of opening ST of the throttle valve 17 is calculated from the map as indicated in FIG. 13A. Subsequently in step 112, a target opening amount SE of the EGR control valve 25 is calculated from the map as indicated in FIG. 13B, and the opening amount of the EGR control valve 25 is controlled to the calculated target opening amount SE. Subsequently in step 113, the intake air flow rate Ga detected by the mass flow meter 17a is read or received by the ECU 30. In step 114, the actual air-fuel ratio $(A/F)_R$ is calculated from the amount of fuel injection Q and the intake air flow rate Ga. Subsequently in step 115, a target air-fuel ratio A/F is calculated from the map as indicated in FIG. 12B. Step 115 is followed by step 116 in which it is determined whether the actual air-fuel ratio $(A/F)_R$ is greater than the target air-fuel ratio A/F. If $(A/F)_R$>A/F, the process proceeds to step 117 in which a correction value $\Delta ST$ of the throttle opening is reduced by a constant value $\alpha$. Namely, the constant value $\alpha$ is subtracted from the correction value $\Delta ST$ used in the last control cycle, thereby to update the correction value $\Delta ST$. Then, the process proceeds to step 119. Conversely, if $(A/F)_R \leq A/F$, the process proceeds to step 118 in which the correction value $\Delta ST$ of the throttle opening is increased by the constant value $\alpha$. Namely, the constant value $\alpha$ is added to the correction value $\Delta ST$ used in the last control cycle, thereby to update the correction value $\Delta ST$. Then, the process proceeds to step 119. In step 119, a final target opening amount ST of the throttle valve 17 is calculated by adding the correction value $\Delta ST$ to the target opening amount ST, and the opening amount of the throttle valve 17 is controlled to the final target opening amount ST. Namely, the opening amount of the throttle valve 17 is controlled so that the actual air-fuel ratio $(A/F)_R$ becomes equal to the target air-fuel ratio A/F.

If the required load L or the engine revolution speed N changes while the second mode of combustion is being performed, the amount of fuel injected is immediately made equal to the target amount of fuel injection Q set in accordance with the required load L and the engine revolution speed N. For example, if the required load L increases, the amount of fuel injection is immediately increased, so that the torque generated by the engine increases immediately. If the amount of fuel injection Q is increased, and the air-fuel ratio deviates from the target air-fuel ratio A/F, the opening amount of the throttle valve 17 is controlled so that the air-fuel ratio becomes equal to the target air-fuel ratio A/F. Namely, the air-fuel ratio is changed after the amount of fuel injection Q has been changed.

In the foregoing embodiment, the amount of fuel injection Q is controlled in an open-loop manner when the engine operates in the low-temperature combustion mode, and the air-fuel ratio is controlled by changing the opening amount of the throttle valve 17 when the engine operates in the second (or conventional) combustion mode. However, it is possible to feedback-control the amount of fuel injection Q based on the output signal of the air-fuel ratio sensor 23a in the low-temperature combustion mode, and it is also possible to control the air-fuel ratio by changing the opening amount of the EGR control valve 25 in the second or conventional combustion mode.

Figure 16:
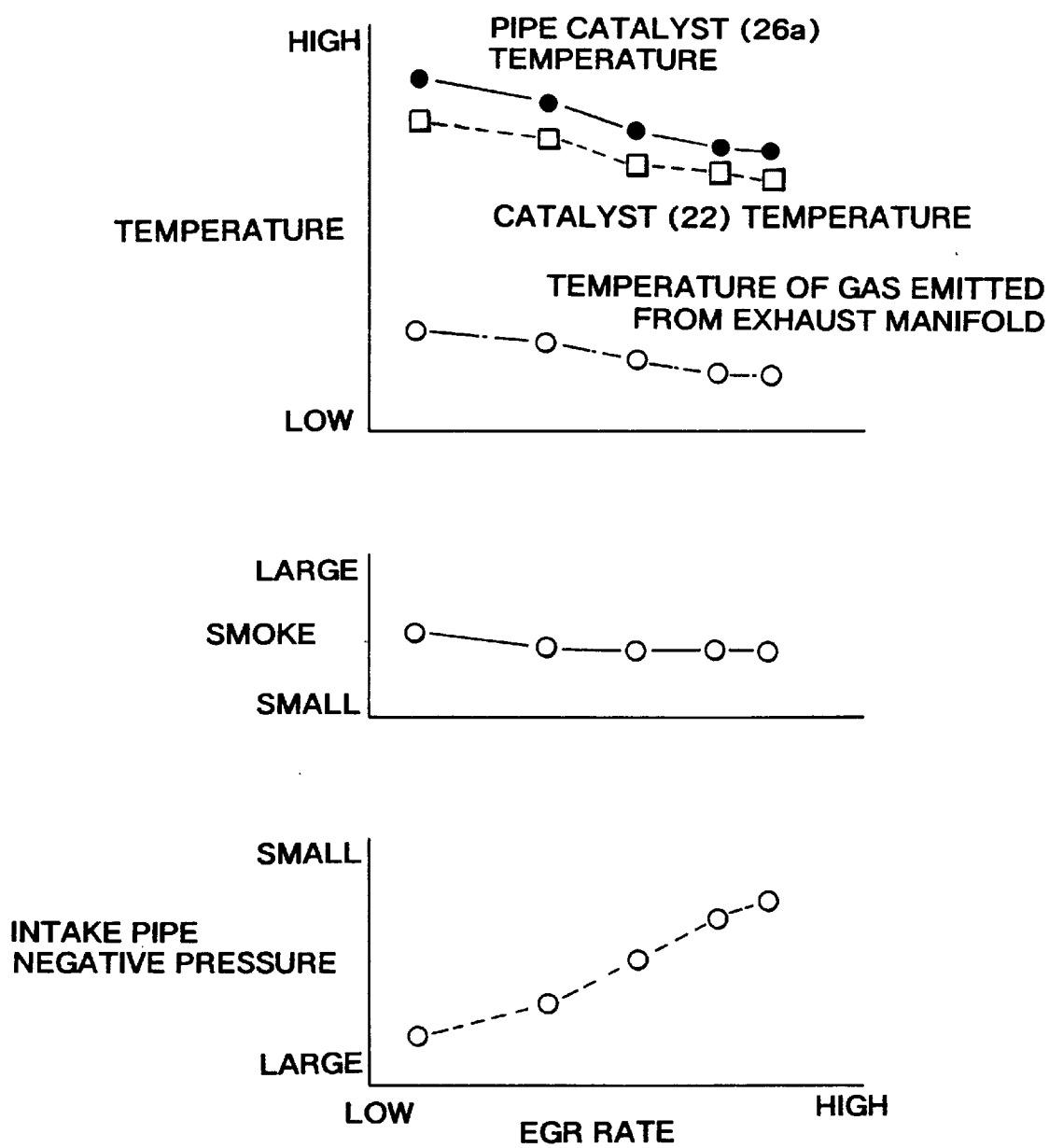
FIG. 16 is a diagram indicating the relationship of the EGR rate with the pipe catalyst temperature and other parameters when the required load is light and the low-temperature combustion is performed with the air-fuel ratio A/F being equal to 15.

FIG. 16 is a diagram indicating the relationships of the EGR rate with the pipe catalyst midbed temperature, the catalyst midbed temperature, the exhaust gas temperature, smoke and the negative pressure in the intake pipe when the required load is light and the low-temperature combustion is performed with the air-fuel ratio A/F being equal to 15. In the example of FIG. 16, the opening amount of the throttle valve 17 is changed in accordance with the EGR rate so that the amount of intake air remains unchanged and the air-fuel ratio A/F is kept constant, irrespective of changes in the EGR rate. As indicated in FIG. 16, as the EGR rate is reduced and the opening amount of the throttle valve 17 is reduced, the intake pipe negative pressure increases and the pumping loss increases. As a result, the exhaust gas temperature becomes higher and the midbed temperature of the pipe catalyst 26a becomes higher, as compared with the case where the EGR rate is relatively high. If the EGR rate is reduced and the opening amount of the throttle valve 17 is reduced, the intake air flow rate is kept constant, but the amount of exhaust gas passing through the catalyst 22 decreases because the amount of EGR gas reduces. As a result, the midbed temperature of the catalyst 22 becomes higher, as compared with the case where the EGR rate is relatively high.

Figure 17A:
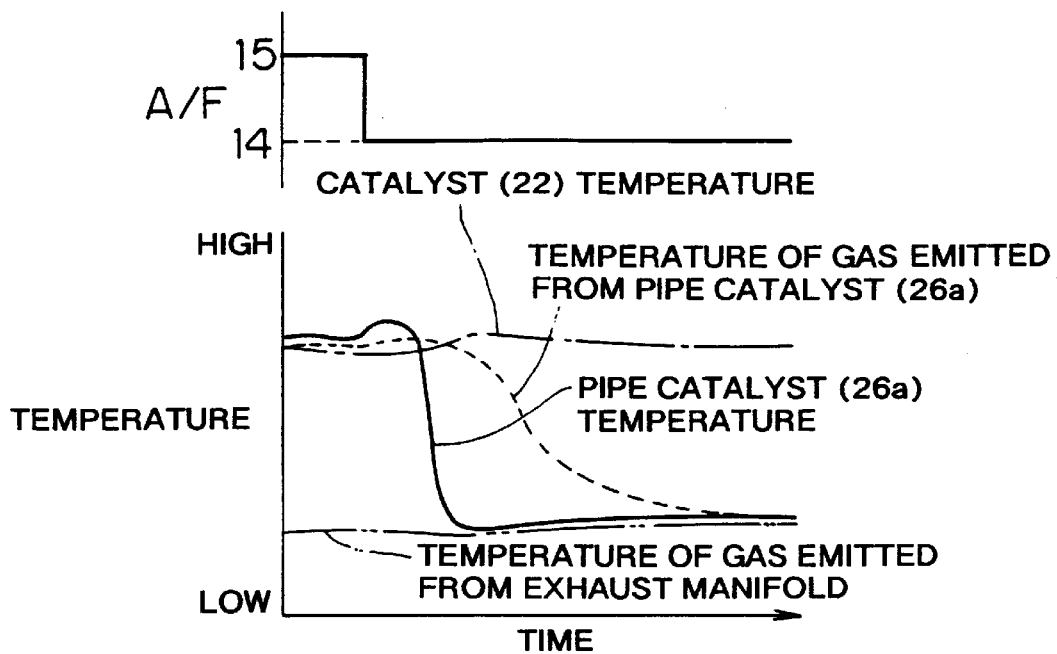
FIGS. 17A and 17B are diagrams for comparison, indicating a case where an EGR control valve is kept fully open and a case where the opening amount of the EGR control valve is reduced, under conditions that the low-temperature combustion is performed and the air-fuel ratio A/F changes from 15 to 14.
Figure 17B:
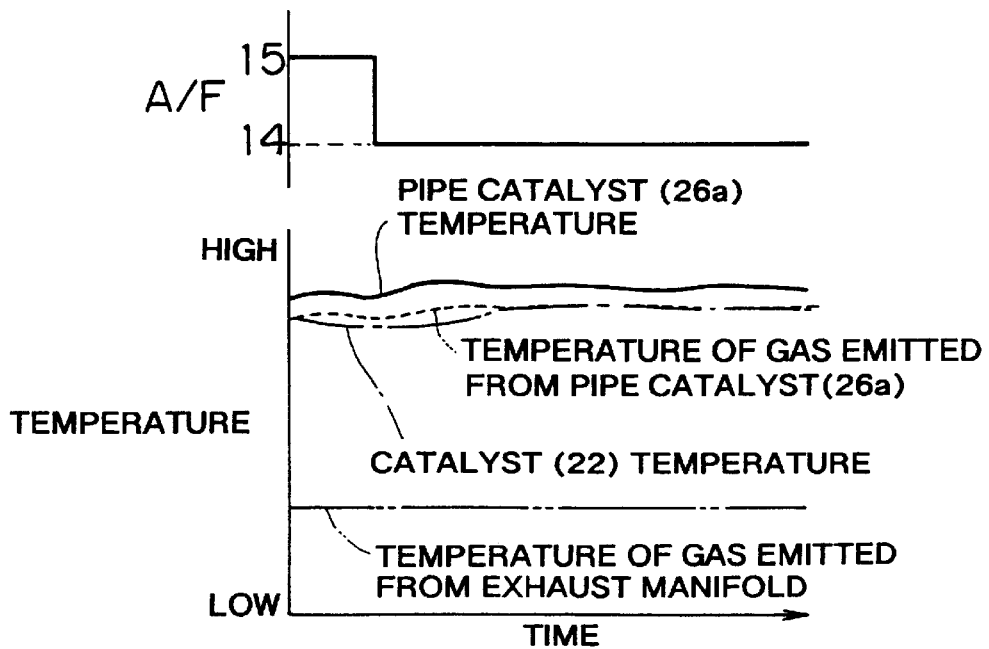

FIGS. 17A and 17B are diagrams for comparison, indicating a case where the EGR control valve is kept fully open and a case where the opening amount of the EGR control valve is reduced, under conditions that the low-temperature combustion is performed and the air-fuel ratio A/F varies from 15 to 14. As indicated in FIG. 17A, if the opening amount of the throttle valve 17 is reduced and the EGR control valve 25 is kept in a fully open position when the air-fuel ratio A/F changes from 15 to 14 during the low-temperature combustion, the intake pipe negative pressure increases and therefore the amount of EGR gas increases. As a result, the pipe catalyst 26a is cooled by the EGR gas passing therethrough, and the temperature of the pipe catalyst 26a is reduced. Furthermore, SOF components are deposited on the pipe catalyst 26a, whereby the catalytic reactions on the pipe catalyst 26a become less likely to occur and the temperature of gas emitted from the pipe catalyst 26a is lowered. On the other hand, as indicated in FIG. 17B, if the opening amount of the throttle valve 17 is reduced and the opening amount of the EGR control valve 25 is also reduced when the air-fuel ratio A/F changes from 15 to 14 during the low-temperature combustion, the exhaust gas temperature rises as the opening amount of the throttle valve 17 decreases. In this case, since the opening amount of the EGR control valve 25 is reduced, the amount of EGR gas does not increase. Therefore, the pipe catalyst 26a is not cooled by the EGR gas, and the midbed temperature of the pipe catalyst 26a is not reduced. As a result, SOF components are not deposited on the pipe catalyst 26a, and the catalyst 26a continues to be recovered, so that catalytic reactions on the pipe catalyst 26a are maintained. Accordingly, the temperature of gas emitted from the pipe catalyst 26a is not reduced.

Figure 18:
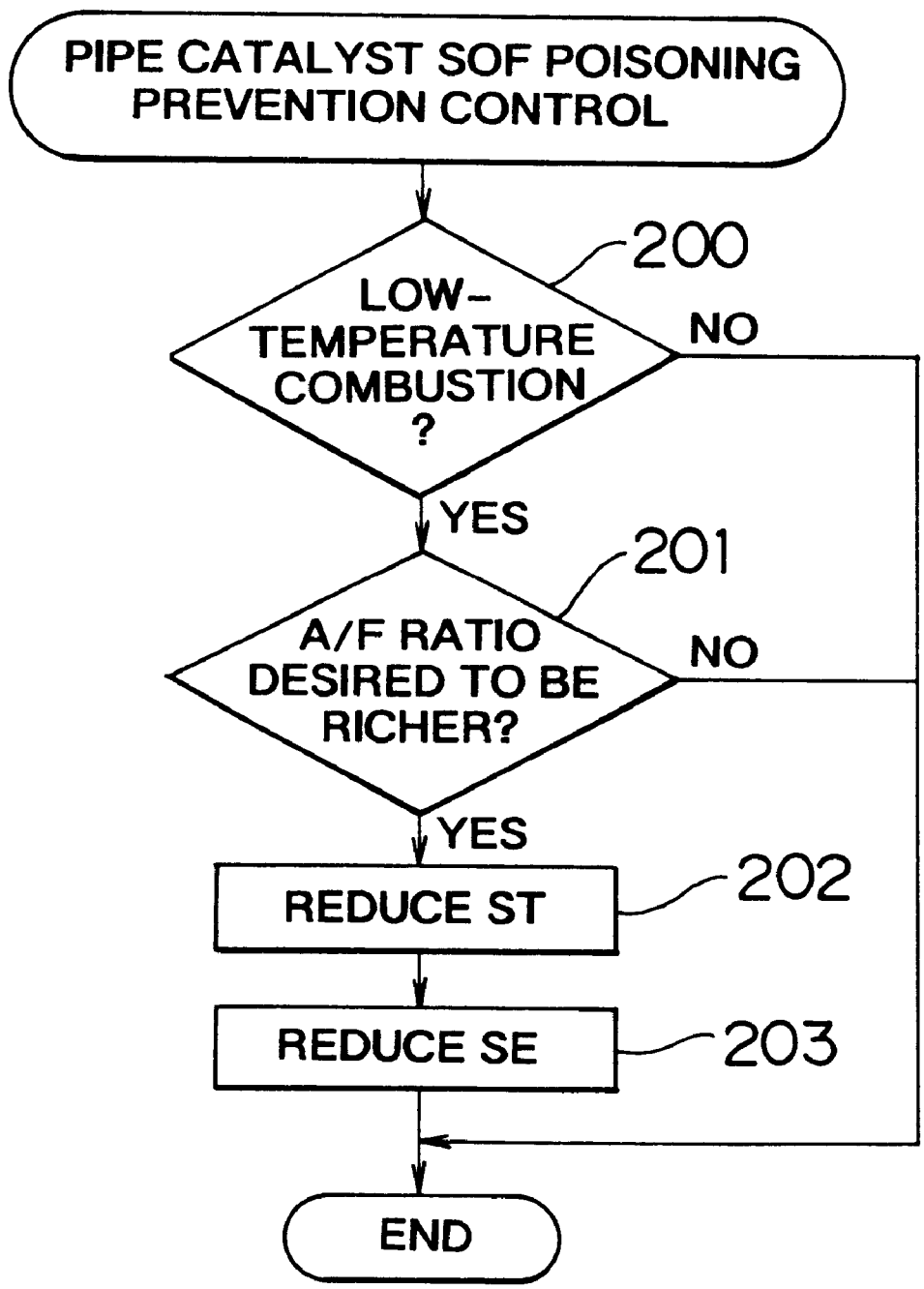
FIG. 18 is a flowchart illustrating a control method for preventing the SOF poisoning of a pipe catalyst.

FIG. 18 is a flowchart illustrating a control method for suppressing the SOF poisoning of the pipe catalyst 26a. As illustrated in FIG. 18, upon the start of this routine, step 200 is initially executed to determine whether the internal combustion engine is operating in such conditions that permit the low-temperature combustion to be carried out. If an affirmative decision "YES" is obtained in step 200, the process proceeds to step 201. If "NO" is obtained in step 200, this routine ends. In step 201, it is determined whether there is a request for shifting or changing the air-fuel ratio to the rich side of the stoichiometric ratio. If "YES" is obtained in step 201, the process proceeds to step 202. If "NO" is obtained in step 201, this routine ends. In step 202, the target opening amount ST of the throttle valve 17 is reduced in order to increase the pumping loss and raise the exhaust gas temperature. Subsequently in step 203, the target opening amount SE of the EGR control valve 25 is reduced in order to prevent the amount of EGR gas from increasing as the opening amount of the throttle valve 17 decreases and the intake pipe negative pressure increases. In a modified example of this embodiment, steps 202 and 203 may be executed only when the temperature of the pipe catalyst 26a is expected to decrease to such an extent that the catalytic reactions on the pipe catalyst 26a become insufficient.

Figure 19A:
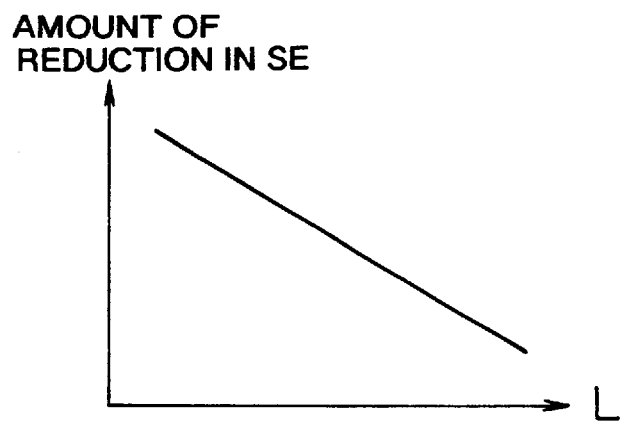
FIG. 19A is a diagram indicating the relationship between the required load and the amount of reduction in the target opening amount SE.
Figure 19B:
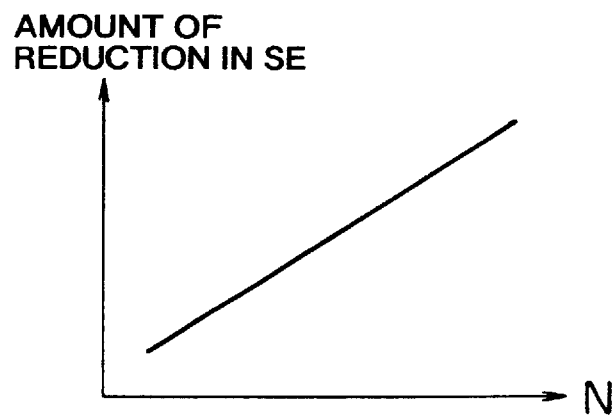
FIG. 19B is a diagram indicating the relationship between the engine speed and the amount of reduction in the target opening amount SE.
Figure 19C:
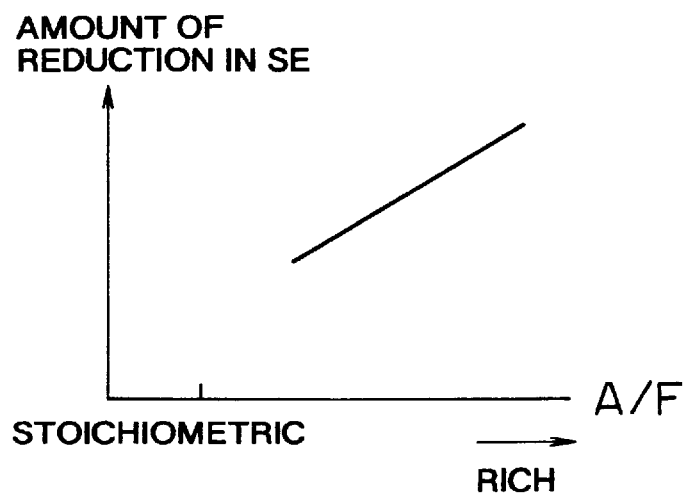
FIG. 19C is a diagram indicating the relationship between the air-fuel ratio and the amount of reduction in the target opening amount SE.

FIGS. 19A to 19C are diagrams indicating the relationships between the amount of reduction in the target opening amount SE and the required load L, the engine speed N and the air-fuel ratio A/F, respectively. As indicated in FIG. 19A, when the target opening amount SE of the EGR control valve 25 is reduced in step 203 in FIG. 18, the amount of reduction in the target opening amount SE of the EGR control valve 25 is set so as to increase as the required load L decreases. Also, as indicated in FIG. 19B, the amount of reduction in the target opening amount SE of the EGR control valve 25 is set so as to increase as the engine speed N increases. Furthermore, as indicated in FIG. 19C, the amount of reduction in the target opening amount SE of the EGR control valve 25 increases as the air-fuel ratio shifts toward the rich side.

According to the embodiment, as illustrated in FIG. 18, when the air-fuel ratio is shifted to the rich side of the stoichiometric ratio when the engine operates in the low-temperature combustion mode, the target opening amount ST of the throttle valve 17 is reduced and the target opening amount SE of the EGR control valve 25 is reduced, as compared with the case where the air-fuel ratio is not shifted to the rich side of the stoichiometric ratio. By reducing the opening amount of the throttle valve 17, the pumping loss is increased so that the exhaust gas temperature can be raised. Furthermore, the opening amount of the EGR control valve 25 is reduced so as to prevent the amount of the EGR gas from increasing with a reduction in the opening amount of the throttle valve 17. This makes it possible to suppress reduction in the combustion temperature and suppress reduction in the EGR gas temperature. Consequently, it is possible to suppress reduction in the temperature of the pipe catalyst 26a and thus substantially prevent the SOF poisoning of the pipe catalyst 26a.

Furthermore, according to the embodiment, the amount of reduction in the target opening amount SE of the EGR control valve 25 is increased as the required load L decreases, as indicated in FIG. 19A. Since the combustion temperature becomes more likely to decrease as the required load L becomes lighter, the amount of reduction in the opening amount of the EGR control valve 25 is increased as the required load L decreases. This arrangement makes it possible to prevent the pipe catalyst 26a from suffering from SOF poisoning due to an otherwise possible reduction in the combustion temperature with a reduction in the required load L.

Still further, according to the embodiment, the amount of reduction in the target opening amount SE of the EGR control valve 25 is increased as the engine speed N increases, as indicated in FIG. 19B. Since the intake pipe negative pressure increases and the amount of the EGR gas is more likely to increase as the engine speed N becomes higher, the amount of reduction in the opening amount of the EGR control valve 25 is increased as the engine speed N increases. This arrangement makes it possible to prevent the pipe catalyst 26a from suffering from SOF poisoning due to an otherwise possible increase in the amount of the EGR gas resulting from an increase in the engine speed N.

Still further, according to the embodiment, the amount of reduction in the opening amount of the EGR control valve 25 is increased as the air-fuel ratio is shifted further to the rich side, as indicated in FIG. 19C. Since the combustion temperature becomes more likely to decrease as the air-fuel ratio is shifted further to the rich side from the stoichiometric ratio, the amount of reduction in the opening amount of the EGR control valve 25 is increased as the air-fuel ratio is shifted further to the rich side. This arrangement makes it possible to prevent the pipe catalyst 26a from suffering from SOF poisoning due to an otherwise possible reduction in the combustion temperature resulting from a shift of the air-fuel ratio to the richer side.

Figure 20:
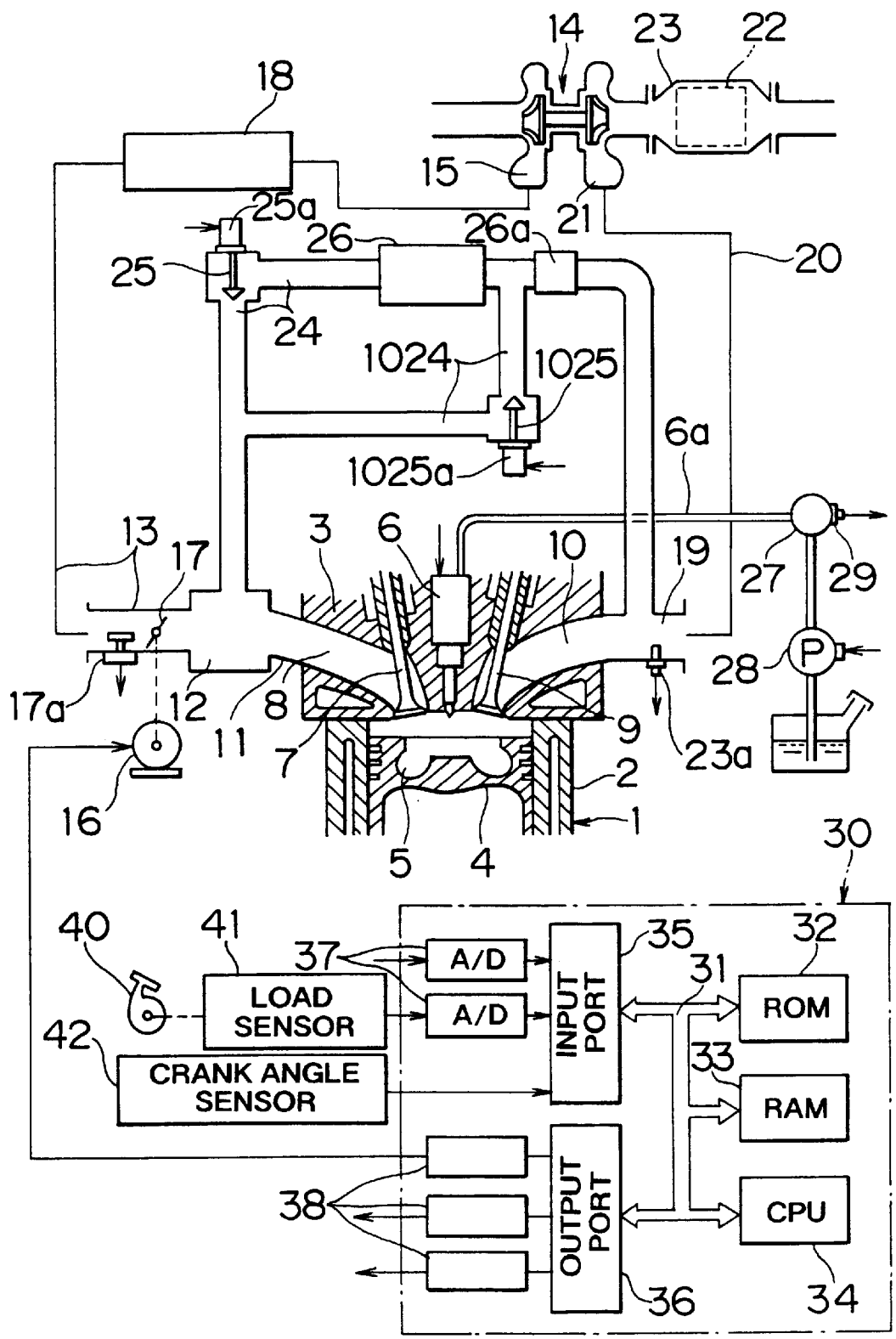
FIG. 20 is a diagram illustrating the overall construction of a compression ignition type internal combustion engine according to a second embodiment of the invention.

An internal combustion engine according to a second embodiment of the invention will be hereinafter described. FIG. 20 is a schematic diagram illustrating the construction of the internal combustion engine according to the second embodiment of the invention. As shown in FIG. 20, the construction of this embodiment is substantially the same as that of the first embodiment shown in FIG. 1. Therefore, this embodiment is able to yield substantially the same advantages as those of the first embodiment. This embodiment differs from the first embodiment in that a second EGR passage 1024 is provided in parallel to the EGR passage 24, and the second EGR passage 1024 is provided with a second EGR control valve 1025 that is driven by a stepping motor 1025a. When the required load L is light, EGR gas is caused to flow through the second EGR passage 1024, rather than through the EGR passage 24. Namely, the EGR gas does not pass through the EGR cooler 26. As a result, even when the required load L is light, relatively high-temperature EGR gas is supplied into the combustion chamber 5, so that relatively high combustion temperature is maintained.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An internal combustion engine, comprising:
   an exhaust gas recirculation control valve disposed in an exhaust gas recirculation passage through which an exhaust gas discharged from a combustion chamber is recirculated into an intake passage of the engine;
   a catalyst disposed in the exhaust gas recirculation passage, the catalyst being operable to purify recirculated exhaust gas passing through the exhaust gas recirculation passage; and
   a throttle valve disposed in the intake passage;
   wherein an amount of soot produced gradually increases and reaches a peak as an amount of the recirculated exhaust gas supplied to the combustion chamber increases, and, when the amount of the recirculated exhaust gas supplied to the combustion chamber further increases, a temperature of fuel and surrounding gas at the time of combustion in the combustion chamber becomes lower than temperatures that permit production of soot, the internal combustion engine being capable of operating in a combustion mode in which the amount of the recirculated exhaust gas supplied to the combustion chamber is larger than that of the recirculated exhaust gas with which the amount of soot produced reaches a peak, and almost no soot is produced;

the internal combustion engine further comprising:
a controller that reduces an opening amount of the exhaust gas recirculation control valve and reduces an opening amount of the throttle valve when the air-fuel ratio is shifted to a rich side of the stoichiometric ratio while the engine is operating in the combustion mode in which almost no soot is produced, as compared with when the air-fuel ratio is not shifted to the rich side of the stoichiometric ratio.

2. The internal combustion engine as defined in claim 1, wherein the controller increases an amount of reduction in the opening amount of the exhaust gas recirculation valve with a reduction in a load of the internal combustion engine.

3. The internal combustion engine as defined in claim 1, wherein the controller increases an amount of reduction in the opening amount of the exhaust gas recirculation valve with an increase in a revolution speed of the internal combustion engine.

4. The internal combustion engine as defined in claim 1, wherein the controller increases an amount of reduction in the opening amount of the exhaust gas recirculation valve as the air-fuel ratio is shifted to a richer side of stoichiometric ratio.

5. The method as defined in claim 1, wherein an amount of reduction in the opening amount of the exhaust gas recirculation valve is increased as the air-fuel ratio is shifted to a richer side of stoichiometric ratio.

6. The internal combustion engine as defined in claim 1, further comprising:
a cooler disposed around the exhaust gas recirculation passage;
a second exhaust gas recirculating passage formed in parallel with the exhaust gas recirculation passage; and
a second exhaust gas recirculation control valve disposed in the second exhaust gas recirculation passage through which the exhaust gas discharged from the combustion chamber is recirculated into the intake passage without passing through the cooler.

7. A method for controlling an internal combustion engine in which an exhaust gas recirculation control valve is disposed in an exhaust gas recirculation passage through which an exhaust gas discharged from a combustion chamber is recirculated into an intake passage of the engine, a catalyst that purifies recirculated exhaust gas is disposed in the exhaust gas recirculation passage, and a throttle valve is disposed in the intake passage, and in which an amount of soot produced gradually increases and reaches a peak as an amount of the recirculated exhaust gas supplied to the combustion chamber increases, and, when the amount of the recirculated exhaust gas supplied to the combustion chamber further increases, a temperature of fuel and surrounding gas at the time of combustion in the combustion chamber becomes lower than temperatures that permit production of soot, said method comprising the steps of:

operating the internal combustion engine in a combustion mode in which the amount of the recirculated exhaust gas supplied to the combustion chamber is larger than that of the recirculated exhaust gas with which the amount of soot produced reaches a peak, and almost no soot is produced; and reducing an opening amount of the exhaust gas recirculation control valve and reducing an opening amount of the throttle valve when the air-fuel ratio is shifted to a rich side of the stoichiometric ratio while the engine is operating in the combustion mode in which almost no soot is produced, as compared with when the air-fuel ratio is not shifted to the rich side of the stoichiometric ratio.

8. The method as defined in claim 7, wherein an amount of reduction in the opening amount of the exhaust gas recirculation valve is increased with a reduction in a load of the internal combustion engine.

9. The method as defined in claim 7, wherein an amount of reduction in the opening amount of the exhaust gas recirculation valve is increased with an increase in a revolution speed of the internal combustion engine.

* * * * *